US012676906B2

(12) United States Patent     (10) Patent No.:   US 12,676,906 B2

Giladi et al.     (45) Date of Patent:     Jul. 7, 2026

---

(54) METHODS AND SYSTEMS FOR STREAMING CONTENT

(71) Applicant: COMCAST CABLE COMMUNICATIONS, LLC, Philadelphia, PA (US)

(72) Inventors: Alexander Giladi, Denver, CO (US); Alexander Balk, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 235 days.

(21) Appl. No.: 17/368,668

(22) Filed: Jul. 6, 2021

(65) Prior Publication Data

US 2023/0010330 A1     Jan. 12, 2023

(51) Int. Cl.
| | |
|---|---|
| *H04L 29/06* | (2006.01) |
| *G06F 11/1446* | (2026.01) |
| *H04L 65/70* | (2022.01) |
| *H04N 21/24* | (2011.01) |

(52) U.S. Cl.
CPC .......... *H04L 65/70* (2022.05); *G06F 11/1448* (2013.01); *G06F 11/1464* (2013.01); *H04N 21/2402* (2013.01); *H04N 21/2407* (2013.01)

(58) Field of Classification Search
CPC .. H04L 65/70; G06F 11/1448; G06F 11/1464; H04N 21/2402; H04N 21/2407
See application file for complete search history.

(56) References Cited

U.S. PATENT DOCUMENTS

| | | | |
|---|---|---|---|
| 10,026,070 B2 | 7/2018 | Thorpe | |
| 10,177,965 B1 * | 1/2019 | Joshi ..................... | H04L 67/141 |
| 10,440,367 B1 * | 10/2019 | Choi ..................... | H04N 21/24 |
| 10,530,858 B1 * | 1/2020 | Parulkar .............. | G06F 16/178 |
| 11,057,654 B1 * | 7/2021 | Vegas ................ | H04N 21/2385 |
| 2017/0345459 A1 * | 11/2017 | Manville .............. | G11B 27/031 |
| 2019/0045241 A1 * | 2/2019 | Alexander ......... | H04N 21/2181 |
| 2022/0408127 A1 * | 12/2022 | Henry .............. | H04N 21/23418 |

FOREIGN PATENT DOCUMENTS

WO     WO-2016176414 A1     11/2016

* cited by examiner

*Primary Examiner* — Brian J. Gillis
*Assistant Examiner* — Juan C Turriate Gastulo
(74) *Attorney, Agent, or Firm* — Ballard Spahr LLP

(57)       ABSTRACT

A computing device may receive a stream of content (e.g., a live stream of content). The computing device may determine a plurality of representations for the stream of content. The computing device may determine a primary encoder associated with each of the plurality of representations. Determining the primary encoder may be based on the plurality of representations. The computing device may determine viewer data associated with the stream of content. The computing device may determine whether to encode a backup representation for at least one of the plurality of representations. Determining whether to encode the backup representation may be based on the viewer data associated with the stream of content. The computing device may cause at least one backup encoder to encode the backup representation for the at least one of the plurality of representations.

20 Claims, 11 Drawing Sheets

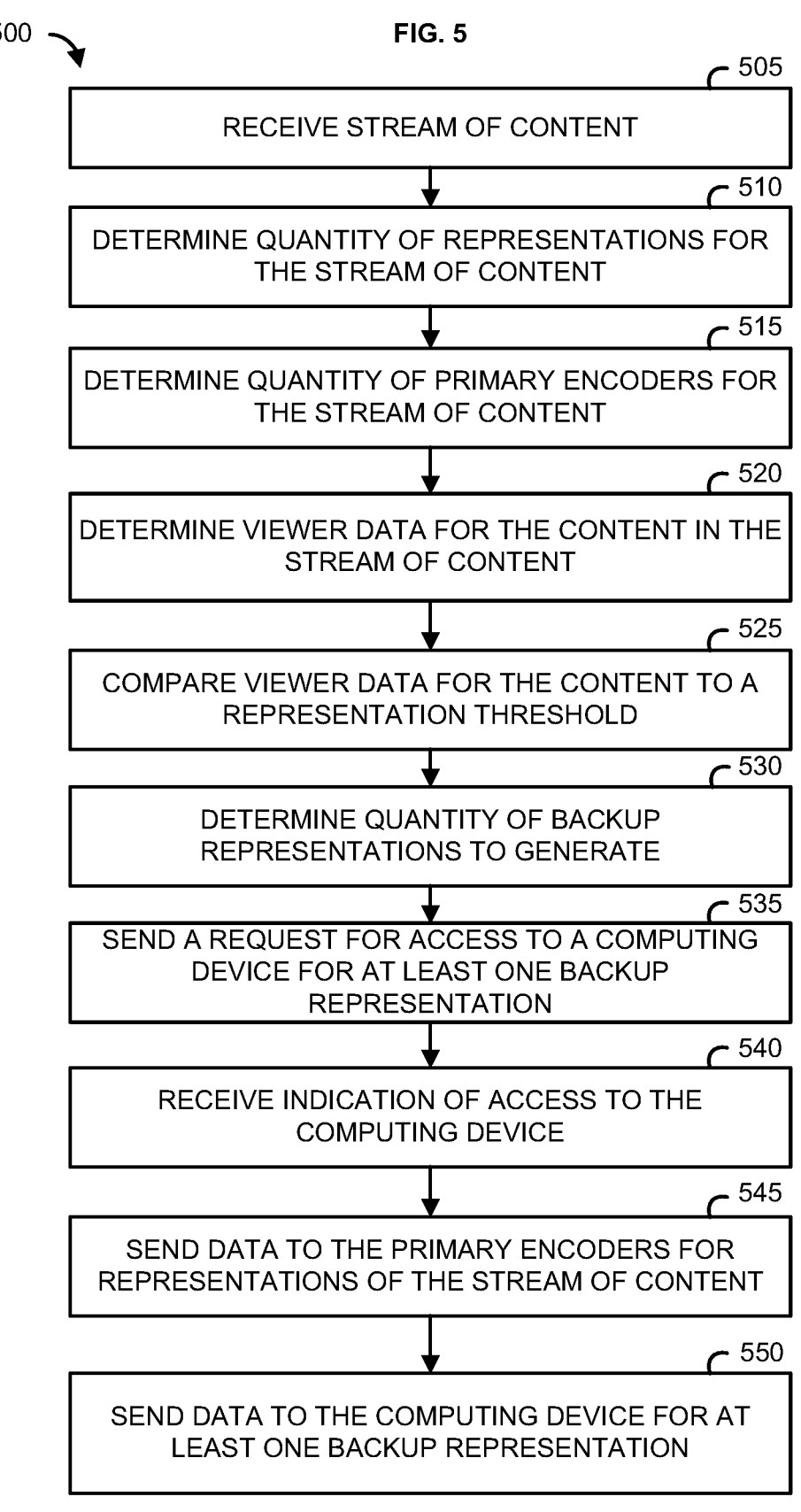

505
RECEIVE STREAM OF CONTENT

510
DETERMINE QUANTITY OF REPRESENTATIONS FOR THE STREAM OF CONTENT

515
DETERMINE QUANTITY OF PRIMARY ENCODERS FOR THE STREAM OF CONTENT

520
DETERMINE VIEWER DATA FOR THE CONTENT IN THE STREAM OF CONTENT

525
COMPARE VIEWER DATA FOR THE CONTENT TO A REPRESENTATION THRESHOLD

530
DETERMINE QUANTITY OF BACKUP REPRESENTATIONS TO GENERATE

535
SEND A REQUEST FOR ACCESS TO A COMPUTING DEVICE FOR AT LEAST ONE BACKUP REPRESENTATION

540
RECEIVE INDICATION OF ACCESS TO THE COMPUTING DEVICE

545
SEND DATA TO THE PRIMARY ENCODERS FOR REPRESENTATIONS OF THE STREAM OF CONTENT

550
SEND DATA TO THE COMPUTING DEVICE FOR AT LEAST ONE BACKUP REPRESENTATION

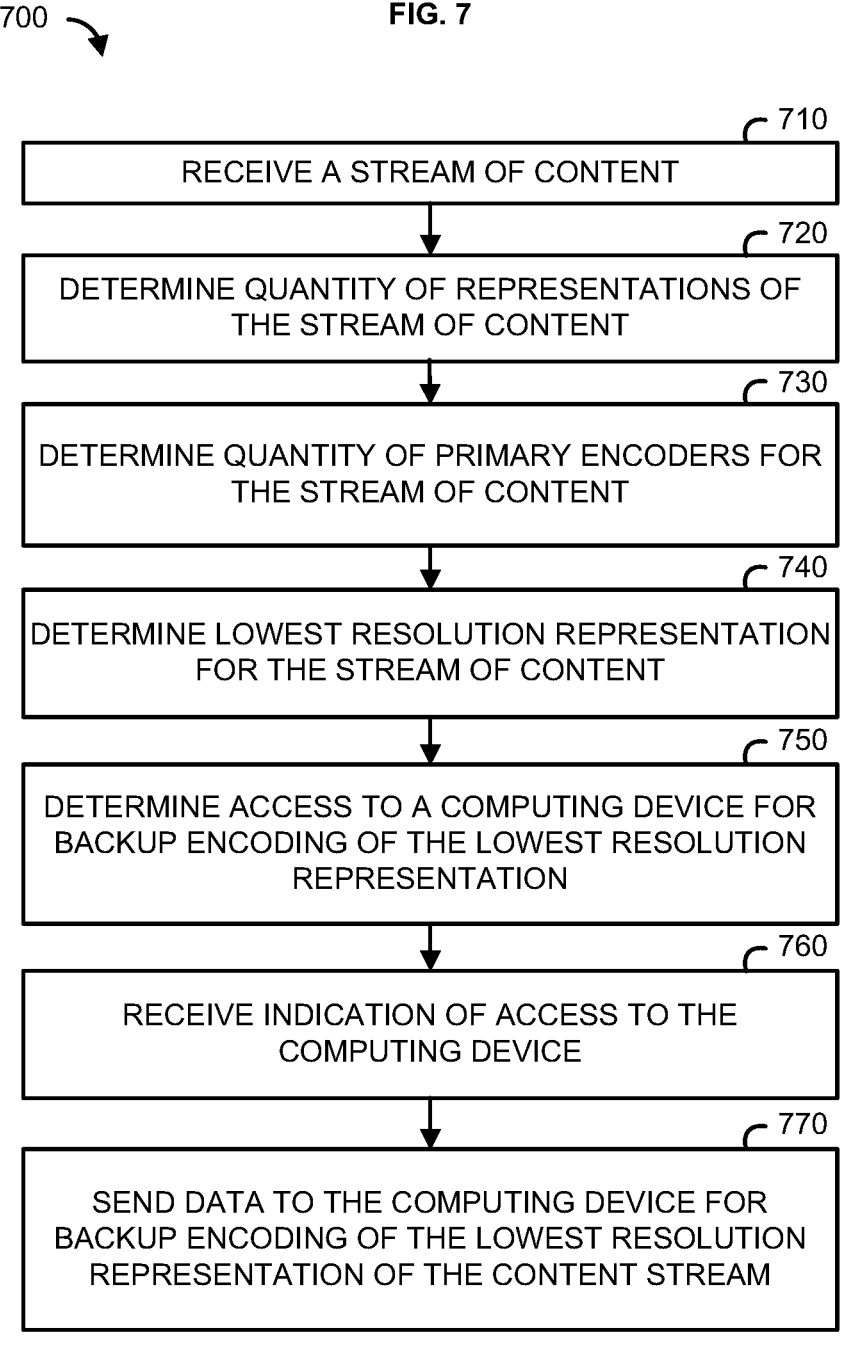

710

RECEIVE A STREAM OF CONTENT

720

DETERMINE QUANTITY OF REPRESENTATIONS OF THE STREAM OF CONTENT

730

DETERMINE QUANTITY OF PRIMARY ENCODERS FOR THE STREAM OF CONTENT

740

DETERMINE LOWEST RESOLUTION REPRESENTATION FOR THE STREAM OF CONTENT

750

DETERMINE ACCESS TO A COMPUTING DEVICE FOR BACKUP ENCODING OF THE LOWEST RESOLUTION REPRESENTATION

760

RECEIVE INDICATION OF ACCESS TO THE COMPUTING DEVICE

770

SEND DATA TO THE COMPUTING DEVICE FOR BACKUP ENCODING OF THE LOWEST RESOLUTION REPRESENTATION OF THE CONTENT STREAM

FIG. 8

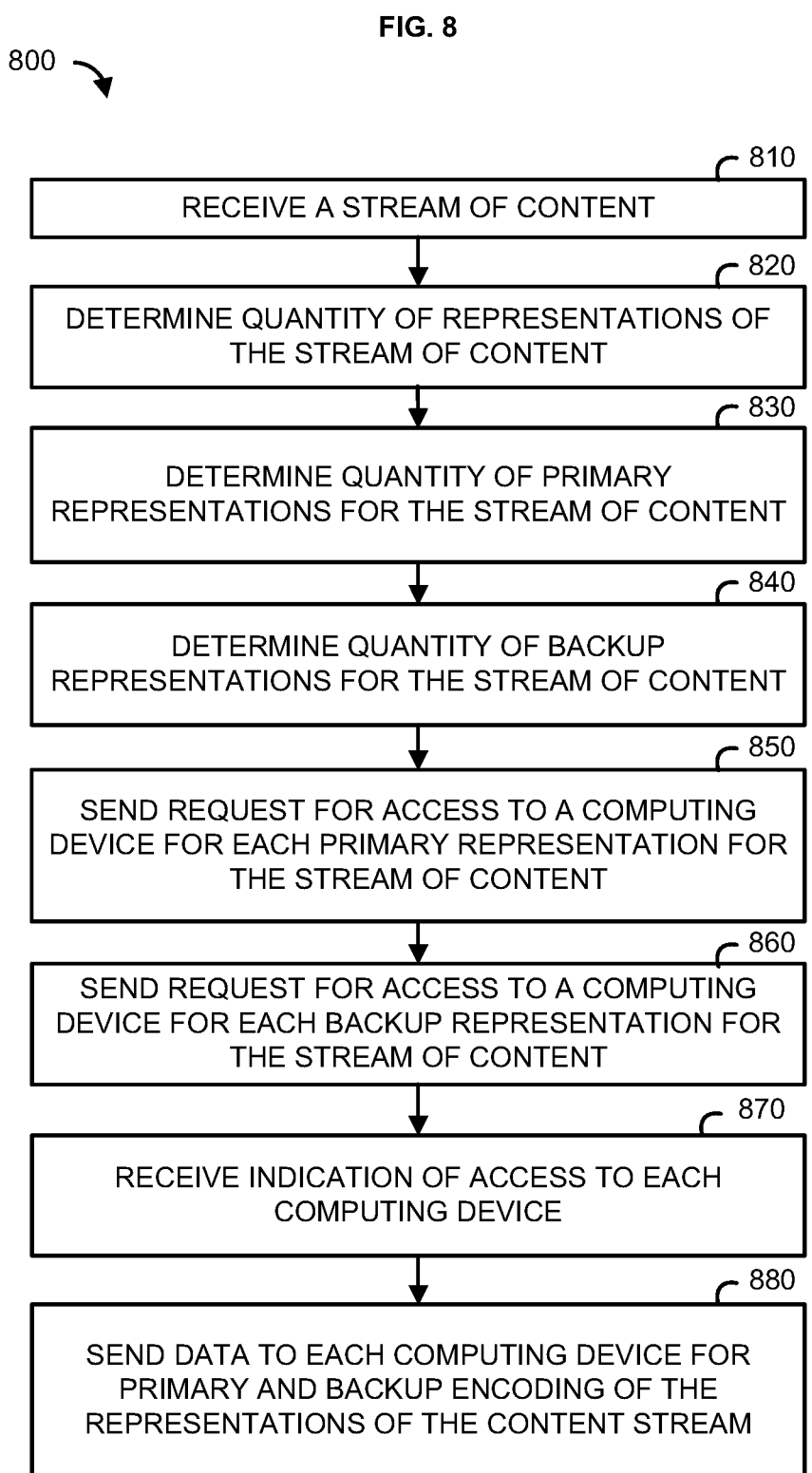

800

810
RECEIVE A STREAM OF CONTENT

820
DETERMINE QUANTITY OF REPRESENTATIONS OF THE STREAM OF CONTENT

830
DETERMINE QUANTITY OF PRIMARY REPRESENTATIONS FOR THE STREAM OF CONTENT

840
DETERMINE QUANTITY OF BACKUP REPRESENTATIONS FOR THE STREAM OF CONTENT

850
SEND REQUEST FOR ACCESS TO A COMPUTING DEVICE FOR EACH PRIMARY REPRESENTATION FOR THE STREAM OF CONTENT

860
SEND REQUEST FOR ACCESS TO A COMPUTING DEVICE FOR EACH BACKUP REPRESENTATION FOR THE STREAM OF CONTENT

870
RECEIVE INDICATION OF ACCESS TO EACH COMPUTING DEVICE

880
SEND DATA TO EACH COMPUTING DEVICE FOR PRIMARY AND BACKUP ENCODING OF THE REPRESENTATIONS OF THE CONTENT STREAM

METHODS AND SYSTEMS FOR STREAMING CONTENT

BACKGROUND

A stream of content (e.g., video, audio, games, applications, data) may be encoded in a variety of representations (e.g., different resolutions bitrates, sampling rates, and/or quantity of channels) in order to display the content on a variety of user devices (e.g., television, laptop computer, smartphone, desktop computer, etc.). In order to ensure that the stream of content is always or almost always available in each of the representations for the stream of content, additional computing resources are used to encode redundant or backup versions of each representation of the stream of content. Typically, these backup versions of each representation will only be sent to a user device if the primary version of the particular representation stops sending or otherwise becomes inoperable. The preparation of backup versions of each representation of a stream of content may thereby require a significant amount of computing resources to prepare content that has a small likelihood of ever being needed for distribution to user devices.

SUMMARY

It is to be understood that both the following general description and the following detailed description are exemplary and explanatory only and are not restrictive. Methods and systems for synchronization of digital rights management data are described.

A computing device, such as a controller, may receive a stream of content (e.g., video, audio, games, applications, data). The computing device may determine the types of representations (e.g., resolutions, bitrates, sampling rates, quantity of channels, etc.) to have generated for the stream of content. The computing device may request temporary access to a first group of one or more computing resources to encode each representation for the stream of content. The computing device may be granted access to the first group of one or more computing resources and may instruct the first group of computing resources to encode the stream of content in multiple different representations.

The computing device may determine how many backup representations and which backup representations (e.g., which resolutions, bitrates, sampling rates, and/or quantities of channels) of the stream of content to encode. Determining the quantity of backup representations and which backup representations to generate may be based on a variety of factors. The computing device may request temporary access to a second group of one or more computing resources to encode the determined quantity of backup representations of the stream of content. The computing device may be granted access to the second group of one or more computing resources and may instruct the second group of computing resources to encode the stream of content in the determined backup representations.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of the present description serve to explain the principles of the apparatuses and systems described herein:

FIG. 2A shows an example system for encoding a stream of content;

FIG. 5 shows a flowchart of an example method for encoding a stream of content;

FIG. 7 shows a flowchart of an example method for encoding a stream of content;

FIG. 8 shows a flowchart of an example method for accessing a computing device to encode a stream of content.

DETAILED DESCRIPTION

Figure 1:
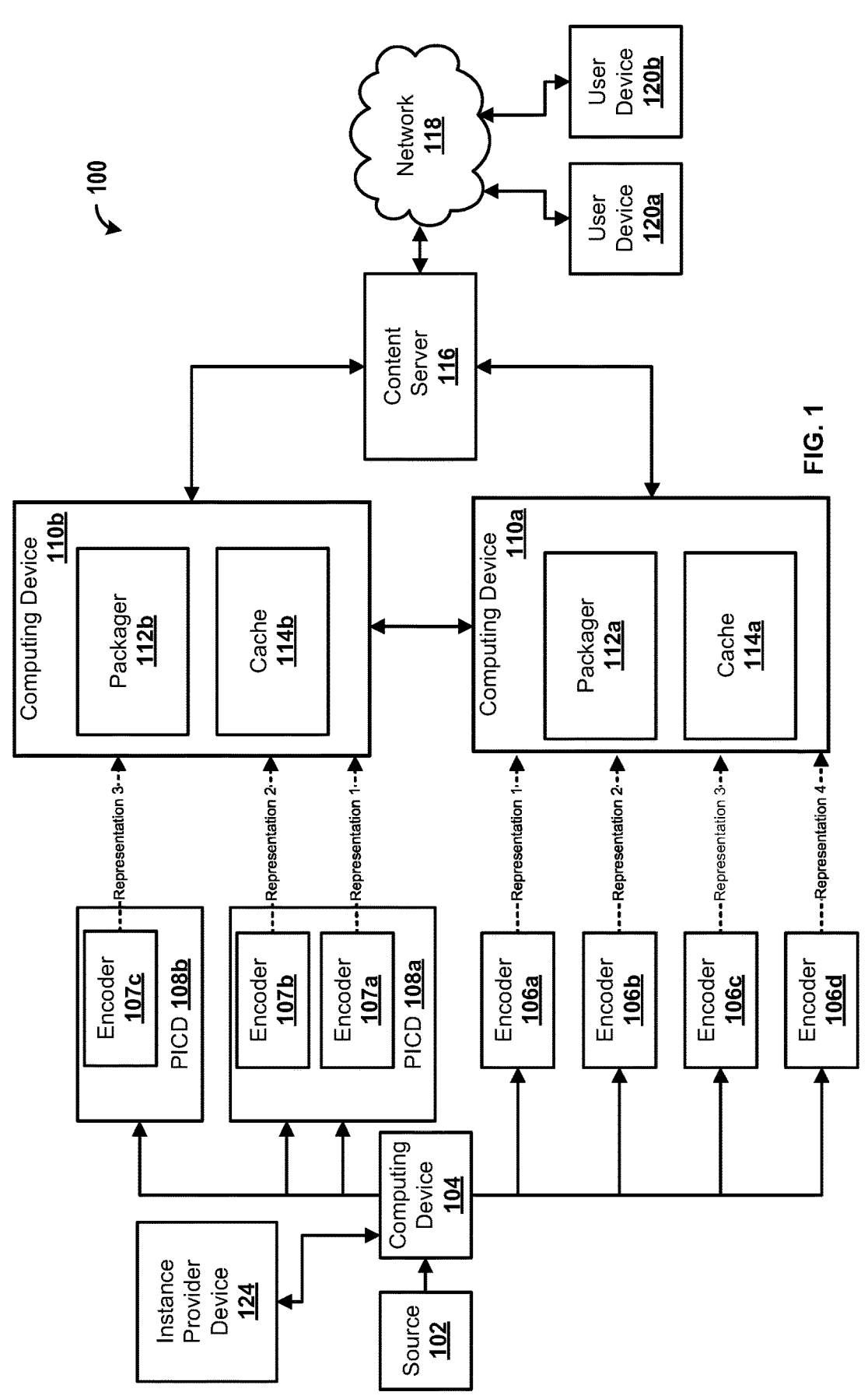
FIG. 1 shows an example system.

As used in the specification and the appended claims, the singular forms "a," "an," and "the" include plural referents unless the context clearly dictates otherwise. When values are expressed as approximations, by use of the antecedent "about," it will be understood that the particular value forms another configuration. "Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memristors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content," as the phrase is used herein, may also be referred to as "data" or "information". Content may be electronic representations of video, audio, text and/or graphics, which may be but is not limited to electronic representations of videos, movies, or other multimedia, which may be but is not limited to data files adhering to MPEG2, MPEG, MPEG4 UHD, HDR, 4k, Adobe® Flash® Video (.FLV) format or some other video file format whether such format is presently known or developed in the future. The content described herein may be electronic representations of music, spoken words, or other audio, which may be but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. Content may be any combination of the above-described formats.

This detailed description may refer to a given entity performing some action. It should be understood that this language may in some cases mean that a system (e.g., a computer) owned and/or controlled by the given entity is actually performing the action.

Methods and systems are described herein for generating encoded content. FIG. 1 shows an example system 100 for the distribution of content to a user device. The system 100 may include a multiple computing devices/entities in communication via a network 118. The network 118 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof. Data may be sent on the network 118 via a variety of transmission paths, including wireless paths (e.g., satellite paths, Wi-Fi paths, cellular paths, etc.) and terrestrial paths (e.g., wired paths, a direct feed source via a direct line, etc.). The network 118 may include public networks, private networks, wide area networks (e.g., Internet), local area networks, and/or the like. The network 118 may include a content access network, content distribution network, and/or the like. The network 118 may be configured to provide content from a variety of sources using a variety of network paths, protocols, devices, and/or the like. The content delivery network and/or content access network may be managed (e.g., deployed, serviced) by a content provider, a service provider, and/or the like. The network 118 may deliver content items from a source(s) (e.g., source 102) to a user device(s) (e.g., user devices 120a, 120b).

The system 100 may include a source 102 (e.g., a content source), such as a server or other computing device. The source 102 may receive streams of content for multiple items of content (e.g., movies, television shows, sports, talk shows, etc.). The streams of content may be live streams of content (e.g., a linear content stream) and/or video-on-demand (VOD) streams of content. The source 102 may receive the streams of content from an external server or device (e.g., a stream capture source, a data storage device, a media server, etc.). The source 102 may receive the streams of content via a wired or wireless network connection, such as the network 118 or another network (not shown).

The source 102 may include a headend, a video-on-demand server, a cable modem termination system, and/or the like. The source 102 may provide streams of content (e.g., video, audio, games, applications, data) to downstream devices. The source 102 may provide one or more streams of content, such as live content, on-demand content (e.g., video-on-demand), content recordings, and/or the like. The source 102 may be managed by third-party content providers, service providers, online content providers, over-the-top content providers, and/or the like. A stream of content may be provided via a subscription, by individual item purchase or rental, and/or the like. The source 102 may be configured to provide the one or more streams of content via the network 118. Streams of content may be accessed by user devices (e.g., user devices 120a, 120b) via applications, such as mobile applications, television applications, set-top box applications, gaming device applications, and/or the like. An application may be a custom application (e.g., by a content provider, for a specific device), a general content browser (e.g., a web browser), an electronic program guide, and/or the like.

The stream of content provided by the source 102 may include an uncompressed stream of content, such as raw video data, comprising one or more portions (e.g., frames/slices, groups of pictures (GOP), coding units (CU), coding tree units (CTU), etc.). It should be noted that although a single content source 102 is shown in FIG. 1, this is not to be considered limiting. In accordance with the described techniques, the system 100 may comprise multiple content sources 102, each of which may provide any number of streams of content.

The system 100 may include a computing device 104. The computing device 104 may include or be configured as a controller or data center. The computing device 104 may be communicably coupled to the one or more content sources 102, one or more primary encoders 106*a-d*, one or more backup encoders 107*a-c*, one or more preemptible instance computing devices 108*a-b*, and/or one or more instance provider devices 124 via the network 118 or another network (not shown). The computing device 104 may be configured to receive the one or more streams of content from the one or more content sources 102 via a wired or wireless network connection, such as the network 118 or another network (not shown). The computing device 104 may be configured to evaluate data associated with the received stream of content and may be configured to determine a quantity of representations of the stream of content to encode. The computing device 104 may also be configured to evaluate data associated with the received stream of content and may be configured to determine a quantity of backup representations of the stream of content to encode.

The computing device 104 may include a preemptible instance analyzer. The preemptible instance analyzer may be configured to communicate with the one or more instance provider devices 124 to bid on and secure the temporary use or access to one or more preemptible instance computing devices 108*a-b*. The preemptible instance analyzer may store or receive bid data that may be used as part of the bidding process with the instance provider devices 124. The bid data may include the current bid price for a preemptible instance computing device 108*a-b*, historical price data for preemptible instance computing devices 108*a-b*, resource requirements for encoding one or more representations of the stream of content, transfer cost data for transferring from one encoding device (e.g., a current preemptible instance computing device 108*a-b*) to a replacement preemptible instance computing device 108*a-b*, probability data for evaluating the probability that temporary access to a preemptible instance computing device 108*a-b* will be terminated.

The computing device 104 may also be configured to communicate with the one or more preemptible instance computing devices 108*a-b* and the one or more encoders (e.g., primary encoders 106*a-d* and/or backup encoders 107*a-c*) implemented in the preemptible instance computing device 108*a-b*. The computing device 104 may be configured to send data (e.g., instructions) to the preemptible instance computing devices 108*a-b* and or the encoders implemented therein, instructing the preemptible instance computing devices 108*a-b* and the implanted encoders therein on the location of the stream of content, how to encode the stream of content, and the location of where to send the encoded stream of content. The computing device 104 may also be configured to receive messages and/or information from the one or more preemptible instance computing devices 108*a-b* regarding potential termination of access to the preemptible instance computing device 108*a-b*. While shown as a separate computing device, in certain examples, the functions, data, and operations of the computing device 104 may be incorporated into the computing device 110*a*.

The system 100 may include one or more instance provider devices 124. Each instance provider device 124 may be a third-party computing device that includes or has access to a plurality of servers/server racks at a plurality of operational sites (e.g., data centers) and may temporarily provide access to the one or more preemptible instance computing devices 108*a-b* on these servers/server racks from the closest operational site (e.g., zone based) or from any operational site (e.g., globally based). The instance provider device 124 may be communicably coupled to the computing device 104 and/or the preemptible instance computing devices 108*a-b*.

The system 100 may include one or more computing devices 108*a-b* (e.g. one or more preemptible instance computing devices 108*a-b*). As used herein, a preemptible instance computing device may be any type of computing device. For example, a preemptible instance computing device 108*a-b* may any type of computing device, computing resource, or virtual machine (e.g., a server, a desktop computer, a laptop computer, a set-top box, a modem or other similar computing device) provided by or under the control of a third-party instance provider. Temporary access to and use of the preemptible instance computing device 108*a-b* may be obtained (e.g., by the computing device 104) for a fee to handle computing operations (e.g., encoding of a stream of content) for or at the instruction of another device (e.g., the computing device 104). Access to the preemptible instance computing device 108*a-b* may be temporary in nature, such that there is a high probability that an operation being executed on the computing device 108*a-b* will be terminated within a 24-hour period of access being provided to that computing device 108*a-b*. The termination (or preemption) of access to the preemptible instance computing device 108*a-b* may be caused by the third-party instance provider or, in the case where the computing device 108*a-b* is a consumer level computing device without a service level agreement, by power, network, or battery issues.

The one or more preemptible instance computing devices 108*a-b* may be communicably coupled to one or more of the computing devices 104, 110*a*, 110*b* and the instance provider device 124. Each preemptible instance computing device 108*a-b* may be a computing device or resource under control of a third-party provider (e.g., the instance provider device 124). For example, the third-party provider may provider another party (e.g. a bidder) access to and use of its computing devices or resources (e.g., the preemptible instance computing device 108*a-b*) for a price, until another party offers a higher price for that particular computing resource. For example, a third-party provider (e.g., the instance provider device 124) may regularly update prices for available preemptible instance computing devices 108*a-b* on a "spot" market. Bidders may then bid a particular price for the particular preemptible instance computing device 108*a-b* or set of resources provided by one or more preemptible instance computing devices 108*a-b*, and if their price is higher than the currently prevailing price for such preemptible instance computing device, an instance of that preemptible instance computing device 108*a-b* may be allocated to the bidder. The bidder (e.g., the computing device 104) may typically have access to the preemptible instance computing device 108*a-b* as long as the bidder's price for preemptible instance computing device is not less than the current price for that or other similar computing resources. If prices rise and the bidder's bid price for the preemptible instance computing device 108*a-b* becomes less than the current price, then the third-party provider (e.g., the instance provider device 124) may deallocate or terminate any of the bidder's instances of the preemptible instance computing device 108*a-b*. The preemptible instance computing device 108*a-b* can be any type of computing device, such as a server, a desktop computer, a laptop computer, a set-top box, or a modem. For example, one or more preemptible instance computing devices 108*a-b* may be configured to operate as an audio and/or video encoder (e.g., primary encoders 106a-d or backup encoders 107a-c) for encoding one or more representations of the stream of content.

The system 100 may include one or more encoders (e.g., primary encoders 106a-d and backup encoders 107a-c), such as a video encoder, an audio encoder, a content encoder, etc. For example, the primary encoders 106a-d may provide the primary or preferred representations of the stream of content to user devices (e.g., user device 120a-b) and the one or more backup encoders 107a-c (e.g., implemented as part of one or more preemptible instance computing devices 108a-b) may be secondary encoders that indirectly provide one or more representations of the stream of content to user devices 120a-b when one or more primary encoders 106a-d are unable to provide a respective representation of the stream of content. For example, the primary encoders 106a-d may be separate machines or computing devices, may be part of the first computing device 110a, or may be implemented within a preemptible instance computing device provided by a third-party provider (e.g., the instance provider device 124). For example, the backup encoders 107a-c may be separate machines or computing devices, may be part of the backup computing device 110b, or may be implemented within a preemptible instance computing device 108a-b provided by a third-party provider (e.g., the instance provider device 124). It should be noted that although four primary encoders 106a-d and three backup encoders 107a-c are shown in FIG. 1, this is not to be considered limiting. In accordance with the described techniques, the system 100 may include any quantity of primary encoders and backup encoders.

Each of the primary encoders 106a-d and secondary encoders 107a-c may be configured to encode a designated representation of the stream of content having various resolutions, bitrates, sampling rates, and/or quantities of channels. Each of the encoders 106a-d, 107a-c may be configured to receive and/or determine one or more encoding parameters for encoding the stream of content at the assigned representation. For example, the encoding parameters may include at least one of and input location for receiving the stream of content (e.g., a Uniform Resource Locator (URL) address), an output location for sending the encoded stream of content (e.g., the computing device 110a or computing device 110b), a representation and/or resolution to encode the stream of content, the one or more bitrates for the encoded representation of the stream of content, one or more encoder settings, one or more CODECs and/or compression settings, filter information, encryption parameters, an encoding quantization level (e.g., a size of coefficient range for grouping coefficients), a predictive frame error, a relative size of an inter-coded frame with respect to an intra-coded frame, a number of motion vectors to encode in a frame, a quantizing step size (e.g., a bit precision), a combination thereof, and/or the like.

Encoding a stream of content may include the encoder 106a-d, 107a-c partitioning a portion and/or frame of the stream of content into multiple coding tree units (CTUs). Each of the CTUs may include multiple pixels. The CTUs may be partitioned into coding units (CUs) (e.g., coding blocks). For example, a stream of content may include multiple frames (e.g., a series of frames/pictures/portions, etc.). The frames may include I-frames, P-frames, and/or B-frames. Each frame of a content item may be divided into a quantity of partitions. Each partition may include multiple pixels. Depending on a coding format (e.g., a CODEC), the partition may be a block, a macroblock, a CTU, etc.

The system 100 may include one or more computing devices 110a, 110b. For example, the system 100 may include a first computing device 110a and a backup computing device 110b. The first computing device 110a may be a primary computing device for packaging content from the one or more primary encoder 106a-d (e.g., optionally implemented in one or more preemptible instance computing devices) and the backup computing device 110b may be a backup computing device for packaging content from the one or more backup encoders 107a-c (e.g., implemented in one or more preemptible instance computing devices 108a-b) when one or more primary encoders 106a-d and/or the first computing device 110a are unable to provide the requested stream of content or the requested representation of the stream of content to a user device 120a-b. It should be noted that although two computing devices 110a, 110b are shown in FIG. 1, this is not to be considered limiting. In accordance with the described techniques, the system 100 may include a more than two computing devices for packaging content for delivery to the users (e.g., at the user devices 120a-b).

The first computing device 110a may include a first packager 112a. The first packager 112a may be configured to receive content (e.g., one or more content items/streams) from one or more of the primary encoders 106a-d. The first packager 112a may be configured to prepare content (e.g., streams of content) for distribution. For example, the first packager 112a may be configured to convert encoded content (e.g., encoded streams of content in one or more representations) into multiple content fragments. The first packager 112a may be configured to encrypt the multiple content fragments based on an encryption key/token. The first computing device 110a (e.g., the first packager 112a) may be configured to encrypt the stream of content based on an encryption key and/or tokens. The encryption keys and/or tokens may also be used to facilitating the decryption of the encrypted content at, for example, the user devices 120a-b. The first computing device 110a may be configured to temporarily store the encrypted, segmented stream of content and metadata in a cache 114a and subsequently send one or more of the encrypted, segmented stream of content and content metadata to the user devices 120a-b via the content server 116.

The second computing device 110b may include a backup packager 112b. The backup packager 112b may be configured to receive one or more encoded representations of the stream of content from one or more of the backup encoders 107a-c. The backup packager 112b may be configured to prepare the encoded stream of content for distribution. For example, the backup packager 112b may be configured to convert an encoded representation of the stream of content into multiple content fragments. The backup packager 112b may be configured to encrypt the multiple content fragments based on an encryption key/token. The encryption keys and/or tokens may also be used to facilitating the decryption of the encrypted content at, for example, the user devices 120a-b. The second computing device 110b may be configured to temporarily store the encrypted, segmented stream of content and metadata in a cache 114b and subsequently send one or more of the encrypted, segmented stream of content and content metadata directly or indirectly to the user devices 120a-b when the user devices are unable to receive the stream of content and/or a representation of the stream of content from the first computing device 110a via the content server 116.

The system 100 may include a content server 116. For example, the content server 116 may be configured to receive requests for content, such as a request for a stream of content from a channel or provider. The content server 116 may identify a location of a requested stream of content and provide the stream of content—or a portion thereof—to a device requesting the stream of content, such as one or more of the user devices 120*a-b* via the network 118 or another network (not shown). The content server 116 may include a Hypertext Transfer Protocol (HTTP) Origin server. The content server 116 may be configured to provide a communication session with a requesting device, such as the user devices 120*a-b*, based on HTTP, FTP, or other protocols. The content server 116 may be one of multiple content servers distributed across the system 100. The content server 116 may be located in a region proximate to one or more user devices 120*a-b*. A request for a stream of content from one or more of the user devices 120*a-b* may be directed to the content server 116 (e.g., due to the location and/or network conditions). The content server 116 may be configured to deliver the encrypted, segmented stream of content to the user device 120*a-b* in a specific format and/or representation requested by the user device 120*a-b*. The content server 116 may be configured to provide the user device 120*a-b* with a manifest file (e.g., or other index file describing portions of the stream of content) received from one of the first computing device 110*a* and/or the second computing device 110*b* and corresponding to a stream of content. The content server 116 may be configured to provide streaming content (e.g., unicast, multicast) to the user device 216.

Figure 2A:
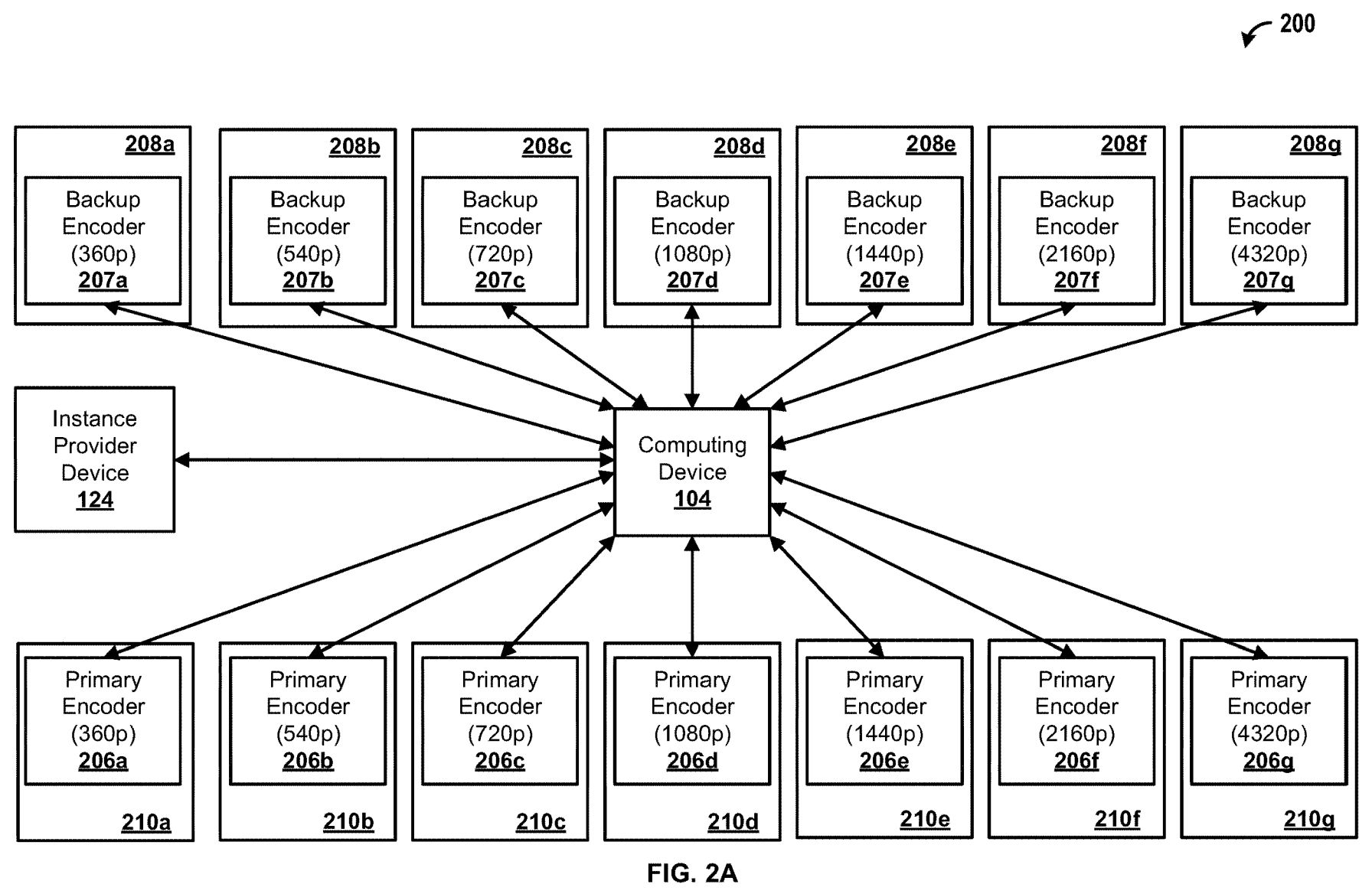

FIG. 2A shows an example system 200 for primary and backup encoding of multiple representations of a stream of content. The computing device 104 may receive the stream of content (e.g., video, audio, games, applications, data). The computing device 104 may determine the quantity and/or types of representations to encode for the stream of content. For example, a representation may be a particular resolution, bitrate, sampling rate, or quantity of channels of the stream of content. For example, multiple representations of the stream of content may be generated because different user devices may require or function better with one or more specific resolutions or bitrates (for video) or quantity of channels or sampling rate (for audio). For example, the computing device 104 may determine that the representations to encode for the particular stream of content may include seven representations (e.g., 360p, 540p 720p, 1080p, 1440p, 2160p (e.g., 4K), and 4320p (e.g., 8K)). In other examples, another amount or representations may be determined and may be based on resolution, bitrate, sampling rate, and/or quantity of channels.

The computing device 104 may determine to encode each of the primary versions of the representations (e.g., primary representations) at different computing devices. For example, the computing device 104 may determine to encode each of the primary representations at a different preemptible instance computing device. For example, the computing device 104 may determine to encode the primary representation for 360p resolution of the stream of content at a primary encoder 206*a* implemented in a first preemptible instance computing device 210*a*. For example, the computing device 104 may determine to encode the primary representation for 540p resolution of the stream of content at a primary encoder 206*b* implemented in a second preemptible instance computing device 210*b*. For example, the computing device 104 may determine to encode the primary representation for 720p resolution of the stream of content at a primary encoder 206*c* implemented in a third preemptible instance computing device 210*c*. For example, the computing device 104 may determine to encode the primary representation for 1080p resolution of the stream of content at a primary encoder 206*d* implemented in a fourth preemptible instance computing device 210*d*. For example, the computing device 104 may determine to encode the primary representation for 1440p resolution of the stream of content at a primary encoder 206*e* implemented in a fifth preemptible instance computing device 210*e*. For example, the computing device 104 may determine to encode the primary representation for 2160p resolution (e.g., 4K resolution) of the stream of content at a primary encoder 206*f* implemented in a sixth preemptible instance computing device 210*f* For example, the computing device 104 may determine to encode the primary representation for 4320p resolution (e.g., 8K) of the stream of content at a primary encoder 206*g* implemented in a seventh preemptible instance computing device 210*g*. In other embodiments, different representations may be determined based on multiple bitrates for video content or a video portion of the stream of content, based on multiple channels for audio content or an audio portion of the stream of content, or based on multiple sampling rates for audio content or an audio portion of the stream of content.

The computing device 104 may communicate with a instance provider device 124 to bid for and obtain each of the preemptible instance computing devices 210*a-g*. For example, the computing device 104 may send a bid and resource requirements to the instance provider device 124. The instance provider device may determine, for each bid, if the bid price is accepted and, if so, may send an indication of acceptance to the computing device 104. The instance provider device 124 may also send identifying information (e.g., a URL address) of the preemptible instance computing device or devices 210*a-g* to which the computing device 104 will receive temporary access. For example, each preemptible instance computing device 210*a-g* may be configured to provide a corresponding primary encoder 206*a-g* for encoding one primary representation of the stream of content. The computing device 104 may send data (e.g., encoding instructions) to each preemptible instance computing device 210*a-g* or directly to the corresponding primary encoder 206*a-g* implemented in each respective preemptible instance computing device 210*a-g*. The data may include an input location (e.g., URL address) for receiving the stream of content, an output or destination location (e.g., URL address) (e.g., the first computing device 210*a*) for receiving the encoded primary representation of the stream of content, the resolution, bitrate, sampling rate, and/or quantity of channels for the particular primary representation of the stream of content, and other encoding parameters for encoding the particular primary representation of the stream of content.

Each primary encoder 206*a-g* may receive the stream of content and encode the stream of content at the instructed representation. Each primary encoder 206*a-g* may send or otherwise transmit each respective encoded primary representation of the stream of content to the first computing device 110*a* for packaging and subsequent delivery to one or more user devices 120*a-b* via the content server 116 and the network 118.

The computing device 104 may also determine the quantity of backup representations to encode for the stream of content. For example, the computing device 104 may determine to encode backup representations for each primary representation encoded. In other examples, the computing device 104 may determine to encode backup representations for only a portion of the primary representations encoded.

For example, the computing device 104 may determine to encode each backup representation at different computing devices. For example, the computing device 104 may determine to encode each backup representation at a different preemptible instance computing device 208*a-g*. For example, the computing device 104 may determine to encode the backup representation for 360p resolution of the stream of content at a backup encoder 207*a* implemented in a first preemptible instance computing device 208*a*. For example, the computing device 104 may determine to encode the backup representation for 540p resolution of the stream of content at a backup encoder 207*b* implemented in a second preemptible instance computing device 208*b*. For example, the computing device 104 may determine to encode the backup representation for 720p resolution of the stream of content at a backup encoder 207*c* implemented in a third preemptible instance computing device 208*c*. For example, the computing device 104 may determine to encode the backup representation for 1080p resolution of the stream of content at a backup encoder 207*d* implemented in a fourth preemptible instance computing device 208*d*. For example, the computing device 104 may determine to encode the backup representation for 1440p resolution of the stream of content at a backup encoder 207*e* implemented in a fifth preemptible instance computing device 208*e*. For example, the computing device 104 may determine to encode the backup representation for 2160p resolution (e.g., 4K resolution) of the stream of content at a backup encoder 207*f* implemented in a sixth preemptible instance computing device 208*f* For example, the computing device 104 may determine to encode the backup representation for 4320p resolution (e.g., 8K) of the stream of content at a backup encoder 207*g* implemented in a seventh preemptible instance computing device 207*g*. In other embodiments, different representations may be determined based on multiple bitrates for video content or a video portion of the stream of content, based on multiple channels for audio content or an audio portion of the stream of content, or based on multiple sampling rates for audio content or an audio portion of the stream of content.

The computing device 104 may communicate with a instance provider device 124 to bid for and obtain each of the preemptible instance computing devices 208*a-g*. For example, the computing device 104 may send a bid and resource requirements to the instance provider device 124. The instance provider device 124 may determine, for each bid, if the bid price is accepted and, if so, may send an indication of acceptance to the computing device 104. The instance provider device 124 may also send identifying information (e.g., a URL address) of the preemptible instance computing device or devices 208*a-g* to which the computing device 104 will receive temporary access. For example, each preemptible instance computing device 208*a-g* may be configured to provide a corresponding backup encoder 207*a-g* for encoding one backup representation of the stream of content. The computing device 104 may send data (e.g., encoding instructions) to each preemptible instance computing device 208*a-g* or directly to the corresponding backup encoder 207*a-g* implemented in each respective preemptible instance computing device 208*a-g*. The data may include an input location (e.g., URL address) for receiving the stream of content, an output or destination location (e.g., URL address) (e.g., the second computing device 210*b*) for receiving the encoded backup representation of the stream of content, the resolution, bitrate, sampling rate, and/or quantity of channels for the particular backup representation of the stream of content, and other encoding parameters for encoding the particular backup representation of the stream of content.

Each backup encoder 207*a-g* may receive the stream of content and encode the stream of content at the instructed representation. Each backup encoder 207*a-g* may send or otherwise transmit each respective encoded backup representation of the stream of content to the second computing device 110*a* for packaging and possible delivery (e.g., if the corresponding primary representation is terminated or fails to generate the encoded primary representation of the stream of content) to one or more user devices 120*a-b* via the content server 116 and the network 118.

Figure 2B:
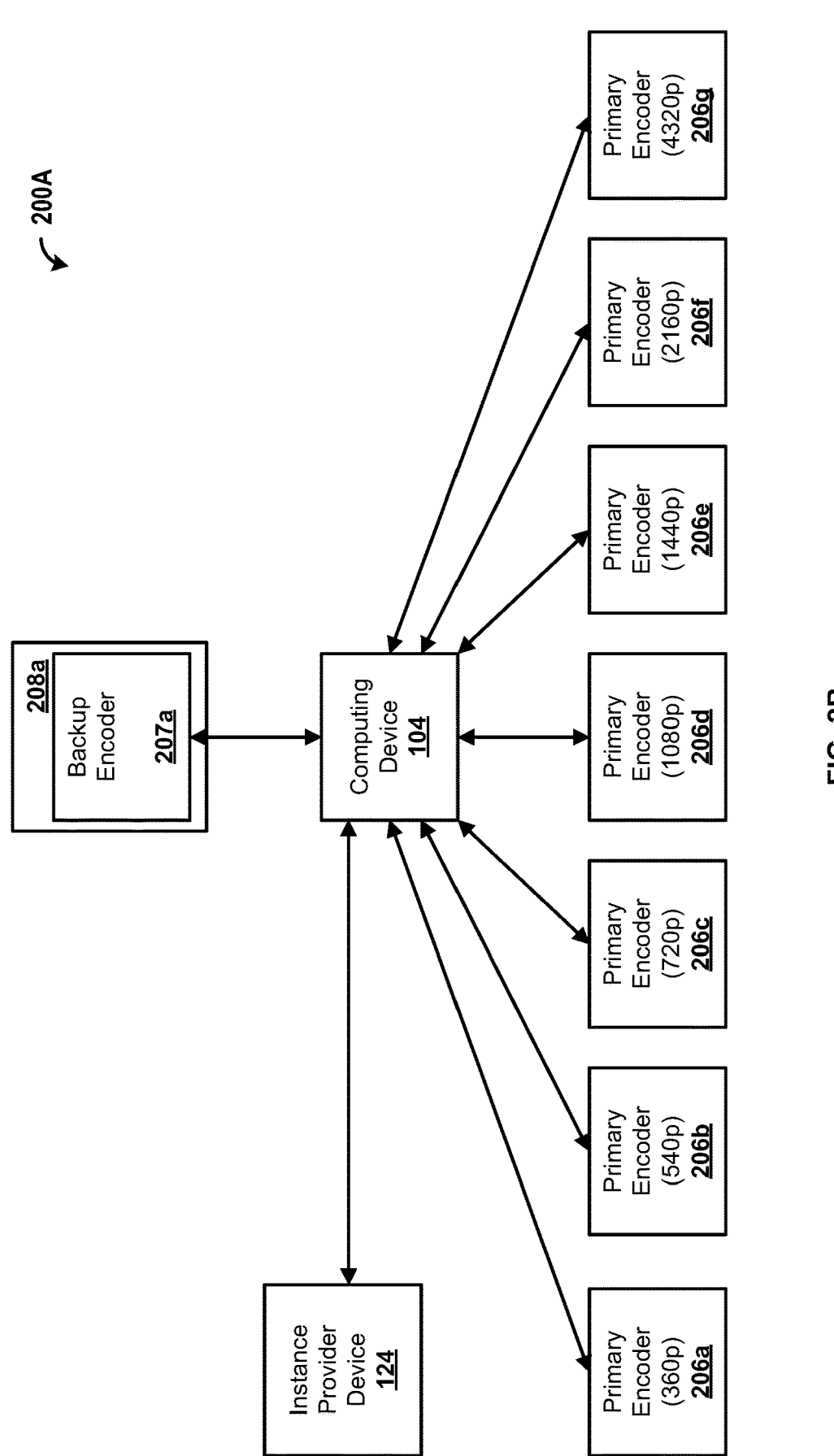
FIG. 2B shows another example system for encoding a stream of content.

FIG. 2B shows another example system diagram 200A for primary and backup encoding of multiple representations of a stream of content. The computing device 104 may receive the stream of content (e.g., video, audio, games, applications, data). The computing device 104 may determine the quantity and/or types of representations to encode for the stream of content. For example, the computing device 104 may determine that the representations to encode for the particular stream of content may include seven representations for the stream of content, each at a different resolution (e.g., 360p, 540p, 720p, 1080p, 1440p, 2160p (e.g., 4K), and 4320p (e.g., 8K)). In other examples, another amount or representations may be determined and may be based on resolution, bitrate, sampling rate, and/or quantity of channels.

In some examples, the computing device 104 may determine to encode each of the primary versions of the representations (e.g., primary representations) at different computing devices. For example, the computing device 104 may determine to encode each of the primary representations at a different preemptible instance computing device in substantially the same manner as described in FIG. 2A. For example, the computing device 104 may determine to encode each of the primary representations at different primary encoders 206*a-g* associated with the first computing device 110*a* and/or the computing device 104. In other examples, the computing device 104 may determine to encode each of the primary representations in a single computing device (not shown) by implementing each primary encoder 206*a-g* in the single computing device in a manner substantially the same as that described with regard to the primary encoders 206*a-g* in FIG. 2A.

The computing device 104 may also determine the quantity of backup representations to encode for the stream of content. For example, the computing device 104 may determine to encode backup representations for only one primary representation encoded. For example, the computing device 104 may determine to encode a backup representation only for the lowest resolution primary representation (e.g., 360p representation). In examples where the representations are based on bitrates, the computing device 104 may determine to encode a backup representation only for the representation having the lowest bitrate primary representation. In examples where the representations are based on sampling rate, the computing device 104 may determine to encode a backup representation only for representation having the lowest sampling rate. In examples where the representations are based on the quantity of channels, the computing device 104 may determine to encode a backup representation only for the representation having the fewest quantity of channels. For example, the computing device 104 may determine to encode a single backup representation for a different representation (e.g., the 1080p representation). Determining which single representation to encode a backup representation for may be based on one or more factors, such as viewer data for each primary representation, time of day, probability of termination of the preemptible instance computing device 208a for encoding the backup representation, whether the representation is an essential representation (e.g., a user device 120a-b can switch from another representation to the essential representation without a substantial loss in quality of the video and/or audio content of the stream of content), or a cost/benefit analysis of not having a backup of the particular representation.

For example, the computing device 104 may determine to encode the backup representation for 360p resolution of the stream of content at a backup encoder 207a implemented in a first preemptible instance computing device 208a. The computing device 104 may communicate with a instance provider device 124 to bid for and obtain the preemptible instance computing device 208a. For example, the computing device 104 may send a bid and resource requirements to the instance provider device 124. The instance provider device 124 may determine, for the bid, if the bid price is accepted and, if so, may send an indication of acceptance to the computing device 104. The instance provider device 124 may also send identifying information (e.g., a URL address) of the preemptible instance computing device 208a to which the computing device 104 will receive temporary access. For example, the preemptible instance computing device 208a may be configured to implement backup encoder 207a for encoding the one backup representation of the stream of content. The computing device 104 may send data (e.g., encoding instructions) to the preemptible instance computing device 208a or directly to the backup encoder 207a implemented in the preemptible instance computing device 208a. The data may include an input location (e.g., URL address) for receiving the stream of content, an output or destination location (e.g., URL address) (e.g., the second computing device 210b) for receiving the encoded backup representation of the stream of content, the resolution, bitrate, sampling rate, and/or quantity of channels for the backup representation of the stream of content, and other encoding parameters for encoding the backup representation of the stream of content.

The backup encoder 207a may receive the stream of content and encode the stream of content at the instructed representation (e.g., 360p resolution). The backup encoder 207a may send or otherwise transmit the encoded backup representation of the stream of content to the second computing device 110a for packaging and possible delivery (e.g., if any one of the primary representations is terminated or fails to generate the corresponding encoded primary representation of the stream of content) to one or more user devices 120a-b via the content server 116 and the network 118.

Figure 2C:
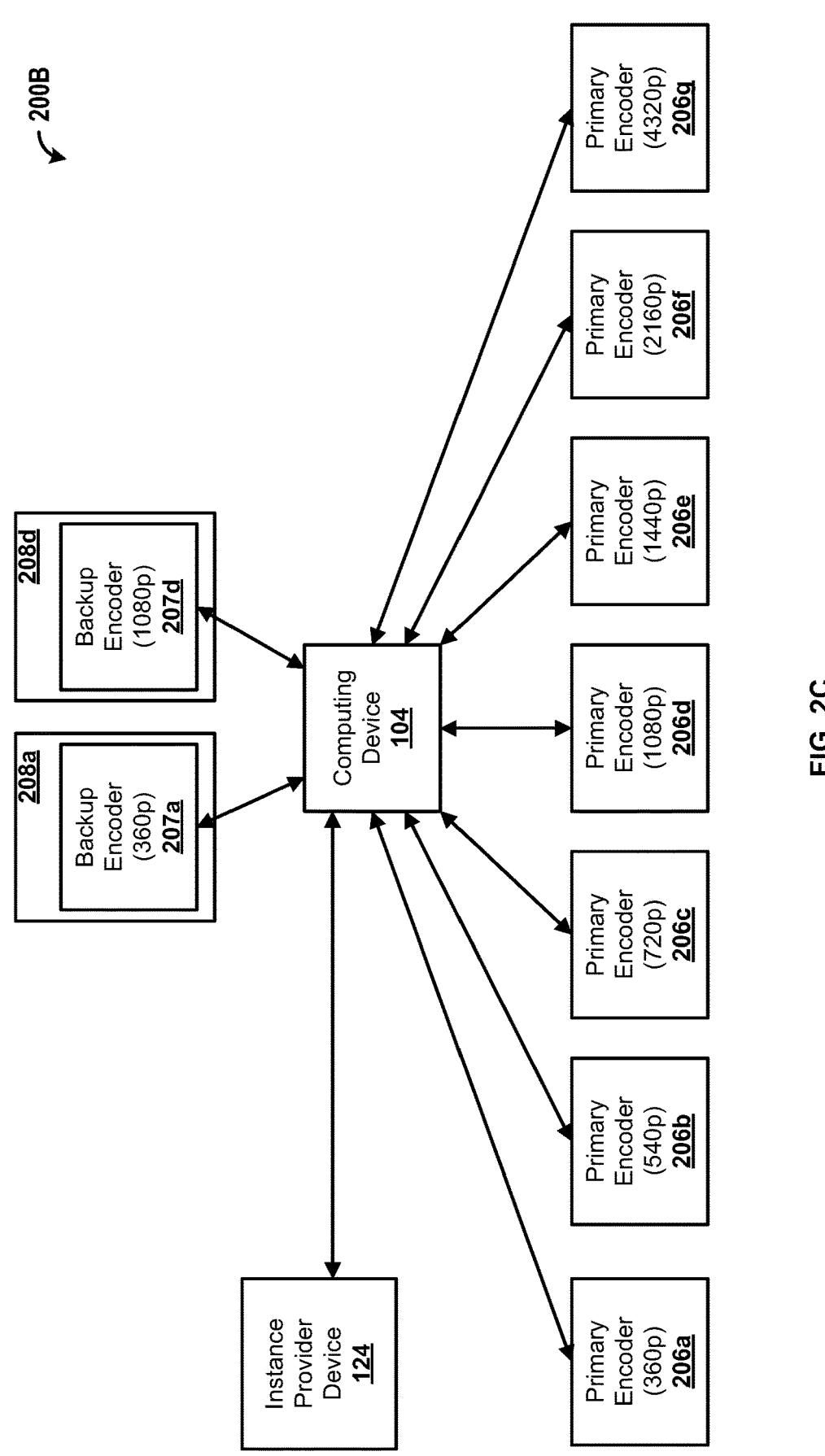
FIG. 2C shows another example system for encoding a stream of content

FIG. 2C shows another example system diagram 200B for primary and backup encoding of multiple representations of a stream of content. The computing device 104 may receive the stream of content (e.g., video, audio, games, applications, data). The computing device 104 may determine the quantity and/or types of representations to encode for the stream of content. For example, the computing device 104 may determine that the representations to encode for the particular stream of content may include seven representations for the stream of content, each at a different resolution (e.g., 360p, 540p, 720p, 1080p, 1440p, 2160p (e.g., 4K), and 4320p (e.g., 8K)). In other examples, another amount or representations may be determined and may be based on resolution, bitrate, sampling rate, and/or quantity of channels.

In some examples, the computing device 104 may determine to encode each of the primary versions of the representations (e.g., primary representations) at different computing devices. For example, the computing device 104 may determine to encode each of the primary representations at a different preemptible instance computing device in substantially the same manner as described in FIG. 2A. For example, the computing device 104 may determine to encode each of the primary representations at different primary encoders 206a-g associated with the first computing device 110a and/or the computing device 104. In other examples, the computing device 104 may determine to encode each of the primary representations in a single computing device (not shown) by implementing each primary encoder 206a-g in the single computing device in a manner substantially the same as that described with regard to the primary encoders 206a-g in FIG. 2A.

The computing device 104 may also determine the quantity of backup representations to encode for the stream of content. For example, the computing device 104 may determine to encode backup representations for less than the quantity of primary representation encoded. For example, the computing device 104 may determine to encode a backup representation only for essential representations. For example, where representations are based on different resolutions, one example of essential representations is 360p representation (e.g., because it is the lowest resolution) and 1080p representation (e.g., because many devices have up-converting capability when receiving content in 1080p to 4K or 8K resolution). In addition, or in the alternative, determining essential representations may be based on the type of content and/or the percentage of user devices 120a-b that access that type of content using a particular representation. For example, certain data may show that when the content in the stream of content is a movie of other particular type of content, user devices 120a-b play the stream of content at the highest resolution about 98% of the time. In addition, most movies are now available in 4K resolution. Given these two factors, a 2160p representation (e.g., 4K resolution) may be an essential representation in certain situations (e.g., when the content in the steam of content is a movie). In examples where the representations are based on bitrates, the computing device 104 may determine to encode a backup representation only for the representation having an essential bitrate. For example, the essential bitrate may be the lowest bitrate and optionally bitrates with high probability of being watched. For example, the video and/or audio portion of the stream of content may be intended to be provided in more than one CODEC (e.g., advanced video coding (AVC) and high efficiency video coding (HEVC) for video and/or advanced audio coding (AAC) and AC-4 for audio). In this example, the essential bitrate may be the lowest common bitrate for the multiple CODECs. In examples where the representations are based on the quantity of channels, the computing device 104 may determine to encode a backup representation only for the representation having an essential quantity of channels. For example, the essential quantity of channels may be two channels. In other examples, the essential quantity of channels may be greater or lesser than two channels. Determining for which representation to encode a backup representation may be based on one or more factors, such as viewer data for each primary representation, time of day, probability of termination of the preemptible instance computing device 208a for encoding the backup representation within a time period, probability of loss of service (e.g., the product of a failure of an essential representation and the probability of someone watching the channel), probability of quality degradation (e.g., the product of probability of a failure of a representation and a probability that the representation is being viewed by user devices), whether the representation is an essential representation, or a cost/benefit analysis of not having a backup of the particular representation.

For example, the computing device 104 may determine to encode the backup representation for 360p resolution of the stream of content at a backup encoder 207a implemented in a first preemptible instance computing device 208a and for 1080p resolution of the stream of content at a backup encoder 207d implemented in a second preemptible instance computing device 208d. The computing device 104 may communicate with a instance provider device 124 to bid for and obtain the preemptible instance computing devices 208a, 208d. For example, the computing device 104 may send a bid and resource requirements to the instance provider device 124. The instance provider device 124 may determine, for the bid, if the bid price is accepted and, if so, may send an indication of acceptance to the computing device 104. The instance provider device 124 may also send identifying information (e.g., a URL address) of the preemptible instance computing devices 208a, 208d to which the computing device 104 will receive temporary access. For example, each preemptible instance computing device 208a, 208d may be configured to implement a corresponding backup encoder 207a, 207d for encoding the determined backup representation of the stream of content. The computing device 104 may send data (e.g., encoding instructions) to the preemptible instance computing devices 208a, 208d or directly to the corresponding backup encoders 207a, 207d implemented in the respective preemptible instance computing devices 208a, 208d. The data may include an input location (e.g., URL address) for receiving the stream of content, an output or destination location (e.g., URL address) (e.g., the second computing device 210b) for receiving the encoded backup representation of the stream of content, the resolution, bitrate, sampling rate, and/or quantity of channels for the backup representation of the stream of content, and other encoding parameters for encoding the backup representation of the stream of content.

The backup encoders 207a, 207d may receive the stream of content and encode the stream of content at the instructed representation (e.g., 360p resolution and 1080p resolution respectively). The backup encoders 207a, 207d may send or otherwise transmit the encoded backup representation of the stream of content to the second computing device 110a for packaging and possible delivery (e.g., if any one of the primary representations is terminated or fails to generate the corresponding encoded primary representation of the stream of content) to one or more user devices 120a-b via the content server 116 and the network 118.

Figure 4:
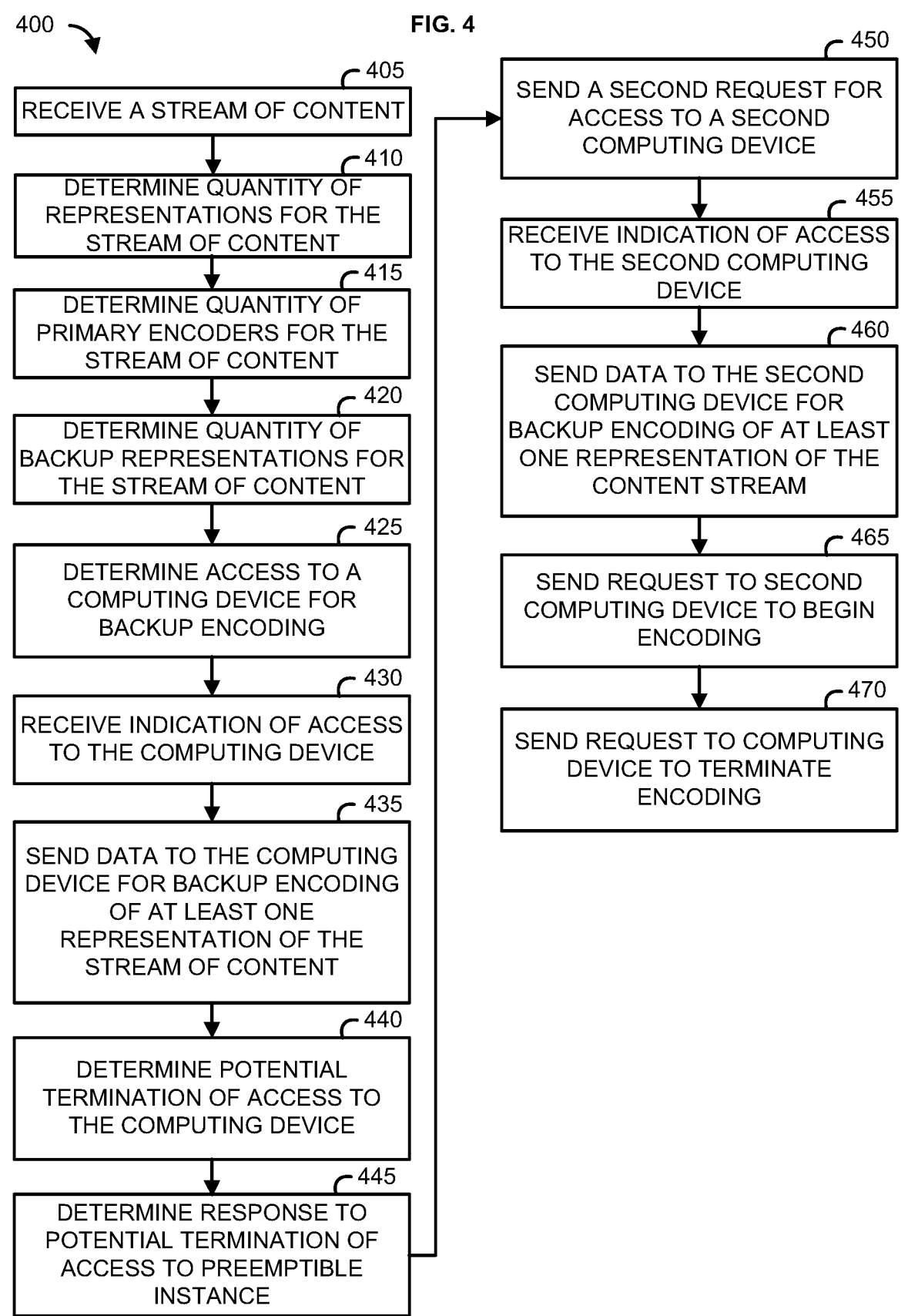
FIG. 4 shows a flowchart of an example method for encoding a stream of content.

FIG. 4 is a flowchart of an example method 400 for determining a quantity of backup representations to encode for a stream of content. At 405, a computing device (e.g., the computing device 104 or computing device 110a) may receive a stream of content. The stream of content may be received from a content source 102. For example, the stream of content may include audio content and/or video content. For example, the stream of content may be a live stream of content (e.g., a linear content stream) a video-on-demand stream of content or another stream of content.

At 410, a computing device (e.g., the computing device 104 or computing device 110a) may determine a quantity of representations for the stream of content. For example, the quantity of representations of the stream of content may be determined based on the quantity of representations being offered to user device (e.g., user devices 120a-b) by the content server 116. For example, at least a portion of the representations may include seven representations for the stream of content (e.g., 360p, 540p, 720p, 1080p, 1440p, 2160p (e.g., 4K), and 4320p (e.g., 8K)). Additional representations may exist, including, but not limited to, a plurality of representations for HTTP live streaming.

At 415, a computing device (e.g., the computing device 104 or computing device 110a) may determine a quantity of primary encoders (e.g., the primary encoders 106a-d or 206a-g) for the stream of content. For example, a different primary encoder 106a-d, 206a-g may be provided for each representation of the stream of content. For example, the quantity of primary encoders 106a-d, 206a-g may equal the quantity of representations of the stream of content. For example, if seven representations for the stream of content (e.g., 360p, 540p, 720p, 1080p, 1440p, 2160p (e.g., 4K), and 4320p (e.g., 8K)), seven separate primary encoders 106a-d, 206a-g may be employed to encode the stream of content, with each primary encoder 106a-g, 206a-g encoding one representation of the stream of content.

At 420, a computing device (e.g., the computing device 104 or computing device 110a) may determine the quantity of backup representations to encode for the stream of content. For example, the quantity of backup representations to encode for the stream of content may be equal to the quantity of representations to encode for the stream of content. For example, the quantity of backup representations to encode for the stream of content may be less than the quantity of representations to encode for the stream of content. For example, the quantity of backup representations to encode for the stream of content may be less than the quantity of primary representations encoded by the primary encoders. For example, the quantity of backup representations to encode for the stream of content may be one backup representation. For example, the one representation may be the representation with the lowest resolution. In other examples, the one representation may be the representation with the lowest bitrate, the lowest sampling rate, and/or the fewest quantity of channels.

The quantity of backup representations to encode may be determined based on one or more factors. For example, the quantity of backup representations to encode may be based on viewer data (e.g., the quantity of viewers of the content and/or quantity of user devices 120a-b accessing the content) associated with the content in the stream of content. For example, the viewer data (e.g., the quantity of viewers of (or user devices 120a-b accessing) the content in the stream of content) may be the current quantity of viewers viewing the stream of content, the current quantity of user devices 120a-b accessing the content, a historical (e.g., prior) quantity of viewers of content associated with the content in the stream of content (e.g., same television show, same talk show, same sporting event, same news show, etc.), a historical quantity of user devices 120a-b accessing content associated with the content in the stream of content, a historical (e.g., prior) average quantity of viewers that viewed content associated with the content in the stream of content (e.g., same television show, same talk show, same sporting event, same news show, etc.) or a historical average quantity of user devices 120a-b that accessed content associated with the content in the stream of content. For example, the viewer data (including the quantity of user devices 120a-b accessing the stream of content) may be determined by the content server 116, another computing device of the system 100, or may be received by the computing device 104 from a third-party via a communication to the computing device 104 or another computing device of the system 100 of FIG. 1. One or more representation thresholds may be provided based on certain viewer data (whether current or historical) for the stream of content. Each threshold may be associated with a particular quantity or group of representations for which to generate backup representations. For example, if viewer data is less than X quantity of viewers for (or user devices 120*a-b* accessing) the content in the stream of content, then zero backup representations may be encoded; if viewer data is between X and Y quantity of viewers for (or user devices 120*a-b* accessing) the content in the stream of content, then one backup representation (e.g., the lowest resolution representation, lowest bitrate representation, lowest sampling rate representation, and/or the representation with the lowest quantity of channels, the representation with the highest probability of use, or another representation) may be encoded; if the viewer data for the content in the stream of content is between Y and Z quantity of viewers for (or user devices 120*a-b* accessing) the content in the stream of content, then three or more backup representations may be encoded; and if the viewer data for the content in the stream of content is greater than Z quantity of viewers for (or user devices 120*a-b* accessing) the content, then backup representations for each of the plurality of representations may be encoded. The schedule provided above is for example purposes only. Those of ordinary skill in the art will recognize that many variations based on the example provided may exist and are within the scope of this disclosure.

In certain examples, it may be desirable to encode multiple backups of one or more of the representation types (e.g., three backup representations for the 1080p representation for a stream of content). In these examples, two or more backup representations representation type may be encoded. For example, certain content of the stream of content may have a significant amount of viewer data (e.g., the quantity of viewers or user devices 120*a-b* accessing the content). Examples may include significant sporting events (e.g., FIFA World Cup, the Super Bowl, a college football national championship game), a significant news event (e.g., war coverage or hurricane coverage), a presidential debate, or other similar content, where it may be deemed critical to ensure that, collectively, at least one version of that representation of the content in the stream of content is active and providing the stream of content to the user devices 120*a-b*. The determination of which representation types for the stream of content to provide the two or more backups and the quantity of backup representations to provide for that representation type may be based on one or more of the viewer data and the probability level that viewers will view the stream of content using that particular representation type.

In other examples, the quantity of backup representations to encode may be based on the time of day. For example, historical data may show that more of fewer viewers watch a particular channel associated with the stream of content during particular times of the day. For example, more viewers may, based on historical data, view the particular channel associated with the stream of content between 7 p.m.-11 p.m. local time versus 1 a.m.-5 a.m. local time. Based on this information, it may be desirable to encode more backup representations of the stream of content during the 7 p.m.-11 p.m. time period as compared to the 1 a.m.-5 a.m. local time period (e.g., encode more backup representations when a greater quantity of viewers are expected to be watching (or user devices 120*a-b* are expected to be accessing) the stream of content). One or more representation thresholds may be provided based on certain historical viewer data for the stream of content. Each threshold may be associated with a particular quantity or group of representations for which to generate backup representations. In these examples, the content being displayed in the stream of content may be the same or different during the same period of time during the day. For example, if viewer data is under X quantity of viewers for (or user devices 120*a-b* accessing) the stream of content for a particular time period (e.g., any time period between 1 minute-12 hours), then zero backup representations may be encoded; if viewer data is between X and Y quantity of viewers for (or user devices 120*a-b* accessing) the stream of content for the particular time period, then one backup representation (e.g., the lowest resolution representation, the lowest bitrate representation, the lowest sampling rate representation, the representation with the fewest quantity of channels, the representation with the highest probability of use, or another representation) may be encoded; if viewer data for the stream of content for the particular time period is between Y and Z quantity of viewers for (or user devices 120*a-b* accessing) the stream of content, then three or more backup representations may be encoded; and if the viewer data for the stream of content for the particular time period is greater than Z quantity of viewers for (or user devices 120*a-b* accessing) the stream of content, then backup representations for each of the plurality of representations may be encoded. The schedule provided above is for example purposes only. Those of ordinary skill in the art will recognize that many variations based on the example provided may exist and are within the scope of this disclosure.

For example, the quantity of backup representations to encode may be based on viewer data (e.g., the quantity of viewers (either current or historical) of (or user devices 120*a-b* accessing) the content in the stream of content at each representation. For example, a viewer threshold may be provided for each representation. The viewer threshold may be the same or different for each representation. The viewer data (either current or historical) may be compared to the viewer threshold. If the viewer threshold is satisfied (e.g., the quantity of viewers (or user devices 120*a-b* accessing the content) is greater than the viewer threshold), then a backup representation may be encoded for the particular representation of the stream of content.

For example, the quantity of backup representations to encode may be based on a cost/benefit analysis for each representation for the stream of content. For example, the quantity of backup representations to encode may be based on a multi-variable cost function. The multi-variable cost function may factor in the probability that both a primary representation and a backup representation for the same representation will fail during the same time period (e.g., $PF(t_0 \ldots t_1)$); the quantity of viewers (or user devices 120*a-b* that will experience the failure of service (e.g., at a user device (e.g., user device 120*a-b*) associated with a viewer) (e.g., $PV(t_0 \ldots t_1)$); and a cost of not failing. The quantity of viewers (or user devices 120*a-b*) that will experience a failure of service may factor in a predicted quantity of viewers (or user devices 120*a-b* accessing the stream of content) for a given time and channel associated with the stream of content, a state of other representations (e.g., which other representations (e.g., either primary representations or backup representations) are expected to be available during that time period, and user device bandwidth (e.g., the ability of the user device to access a higher resolution representation of the stream of content). The cost of not failing may factor in one or more configuration parameters ($\lambda$) expressing a cost/failure tradeoff, the price for a computing device (e.g., a preemptible instance computing device) (e.g., $DC_A$) (e.g., preemptible instance computing device 108$a$-$b$) at time zero ($t_0$) (e.g., $CP(t_0, DC_A)$, and the cost to transfer encoding operations to the preemptible instance computing device ($DC_A$) (e.g., $TP(DC_A)$). Given the associated variables above, the multi-variate cost function may be expressed as $P(PF(t_0 \ldots t_1)) \times P(PV(t_0 \ldots t_1) > 1) + \lambda \times (CP(t_0), DC_A) + TP(DC_A)$. The multi-variate cost function may be solved using one or more of a neural network, random signal processing, a Poisson process, or any other known technique.

For example, the quantity of backup representations to encode may be based on the current bid price for a computing device (e.g., preemptible instance computing device 108$a$-$b$). For example, as the price for temporary access to a preemptible instance computing device 108$a$-$b$ (e.g., per representation it can encode) rises, the fewer the quantity of backup representations to encode. For example, each representation may be associated with a cost threshold. The cost threshold may be the same or different for each representation. The current cost for temporary access to a computing device (e.g., preemptible instance computing device 108$a$-$b$) may be compared to the cost threshold. If the current cost for temporary access to the preemptible instance computing device 108$a$-$b$ is greater than, or greater than or equal to the cost threshold (e.g., satisfies the cost threshold), then a backup representation for the particular representation of the stream of content may not be encoded.

In other examples, the computing device 104 may determine to encode backup representations for a portion but not all of the plurality of the representations. For example, the computing device 103 may determine to encode backup representations for 2, 3, 4, or 5 representations of the plurality of representations. For example, the determination of quantity of backup representations to encode and/or which of the plurality of representations to encode may be based on one or more factors, including, but not limited to the viewer data for the stream of content, the viewer data for each of the plurality of representations for the stream of content, the probability that users will access the stream of content using a particular representation of the plurality of representations, a determination that one or more of the plurality of representations are essential representations (e.g., a user device 120$a$-$b$ can switch from another representation to the essential representation without a substantial loss in quality of the video and/or audio content of the stream of content), and/or a cost/benefit analysis of not having a backup of each particular representation.

At 425, a computing device (e.g., the computing device 104 or computing device 110$a$) may determine access to one or more computing device (e.g. one or more preemptible instance computing devices 108$a$-$b$). For example, preemptible instance computing devices 108$a$-$b$ may be made available by a plurality of third-party providers (e.g., the instance provider device 124). The computing device 104 may be configured to request one or more preemptible instance computing devices 108$a$-$b$ from these third-party providers to obtain pricing and availability information. For example, the computing device 104 can manage submission and cancellation of bids, thereby establishing a third-party provider's current price point for preemptible instance computing devices 108$a$-$b$. For example, the computing device 104 may be configured to test ranges of values around accepted bids to better determine current pricing and/or availability for preemptible instance computing devices 108$a$-$b$. Each of the plurality of third-party providers may host a plurality of servers/server racks that may be temporarily provisioned to third parties (e.g., the computing device 104) as preemptible instance computing devices. For example, each third party provider may provide a plurality of servers/server racks at a plurality of operational sites (e.g., data centers) and may temporarily provide access to the preemptible instance computing devices 108$a$-$b$ from the closest operational site (e.g., zone based) or from any operational site.

The computing device 104 may determine access based on the quantity of backup representations to encode for the stream of content. The computing device 104 may determine access based on the current bid price for the one or more preemptible instance computing devices 108$a$-$b$. The quantity of preemptible instance computing devices 108$a$-$b$ that the computing device 104 may determine access to, may be based on the quantity of representations each preemptible instance computing device 108$a$-$b$ is able to encode and/or the bid price for the particular preemptible instance computing device 108$a$-$b$. For example, the computing device 104 may determine access by sending a request for a preemptible instance computing device 108$a$-$b$. The request may be sent from the computing device 104 to one or more third-party providers of a plurality of preemptible instance computing devices 108$a$-$b$. For example, the request may include one or more resource requirements for a preemptible instance computing device 108$a$-$b$ and a bid price being offered for temporary access to a preemptible instance computing device 108$a$-$b$. The one or more resource requirements may include the processing power of the preemptible instance computing device 108$a$-$b$, the encoding capabilities needed in the preemptible instance computing device 108$a$-$b$, and/or the amount of time of use of the preemptible instance computing device 108$a$-$b$ desired by the computing device 104. In another example, the request may include one or more resource requirements needed by the computing device 104 for encoding one or more backup representations and a query of the current prices for a preemptible instance computing device 108$a$-$b$ that satisfies the requested resource requirements. The one or more third-party providers may send a response to the computing device 104 that includes the one or more current prices (or price range) for temporarily obtaining access to a preemptible instance computing device 108$a$-$b$ with the requested resources. In response, the computing device 104 may send the bid request that includes the one or more resource requirements for a preemptible instance computing device 108$a$-$b$ and a bid price being offered for temporary access to a preemptible instance computing device 108$a$-$b$.

At 430, a computing device (e.g., the computing device 104) may receive an indication of temporary access to a computing device (e.g., one or more preemptible instance computing devices 108$a$-$b$). For example, the indication may be a response from one or more third-party providers (e.g., instance provider device 124) of the preemptible instance computing devices 108$a$-$b$. The response may be based on the bid request sent by the computing device 104. For example, the computing device 104 may receive a response that indicates an acceptance of a bid. The response may also include an indication or identifier of the preemptible instance computing device 108$a$-$b$ that the computing device 104 will temporarily have access to. For example, the indication or identifier may be a URL address for the preemptible instance computing device 108$a$-$b$.

Figure 3:
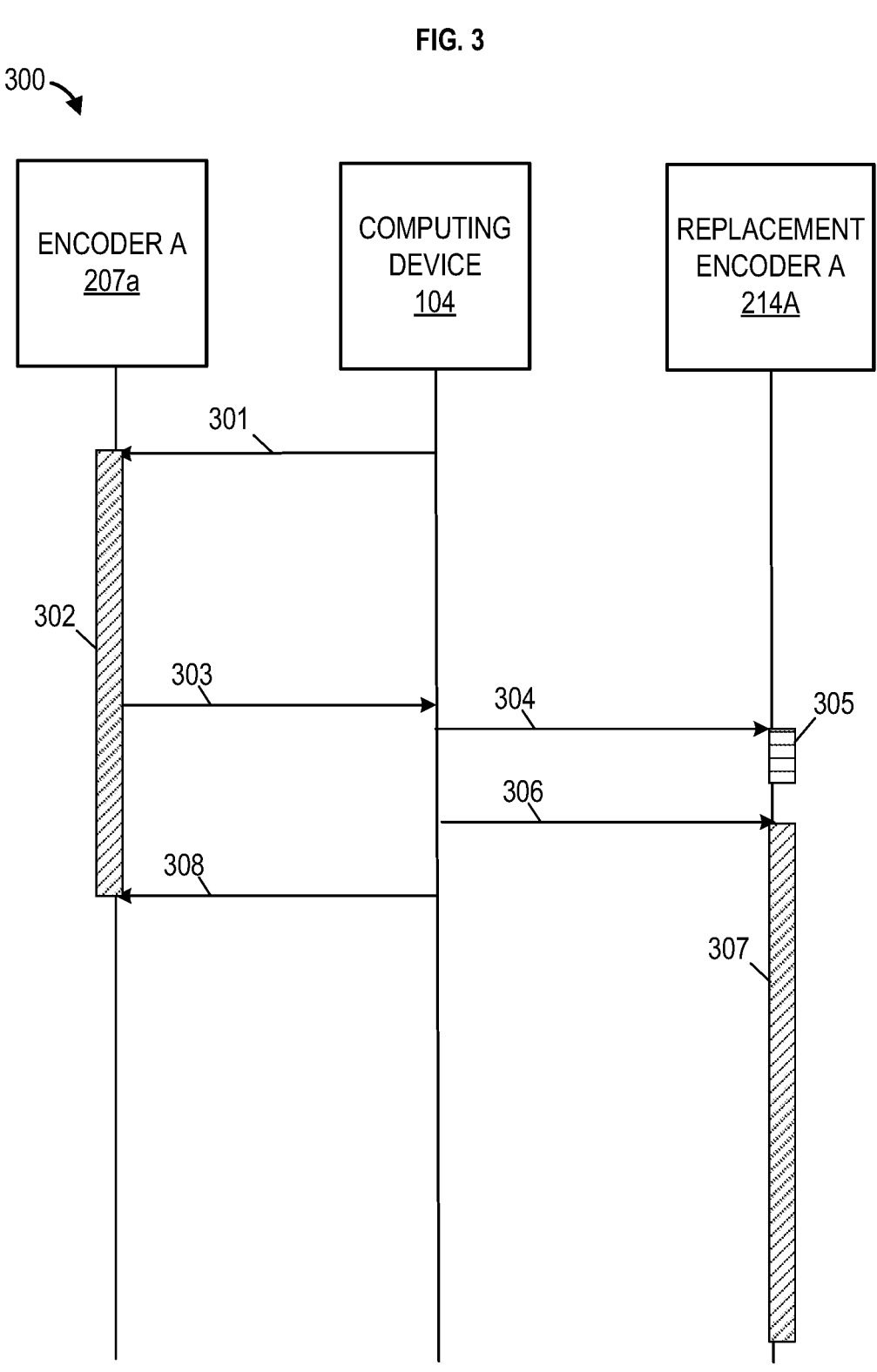
FIG. 3 shows an example communication diagram for encoding a stream of content.

With reference to FIGS. 3 and 4, at 435, a computing device (e.g., the computing device 104) may send data (e.g., 301 of FIG. 3) to or otherwise cause the one or more computing devices 108$a$-$b$ (e.g., the one or more preemptible instance computing device 108*a*-*b*) to encode a backup representation of at least one representation of the stream of content. For example, the preemptible instance computing device 108*a*-*b* may be or include an encoder (e.g., a backup encoder 207A) for encoding a single representation of the stream of content. For example, the data 301 may include encoding instructions. For example, the encoding instructions 301 may include an input address (e.g., a URL address) for a device or location from which the preemptible instance computing device 108*a*-*b* may receive the stream of content. For example, the input address may be a URL address associated with the content source 102 or a cache associated with or included in the computing device 104 or the computing device 110*a* (e.g., when the computing device 104 is part of the computing device 110*a*). For example, the encoding instructions 301 may include an output address (e.g., a URL address) for a device (e.g., the computing device 110*b*) or location to which the preemptible instance computing device 108*a*-*b* may send the encoded backup representation once encoding by the preemptible instance computing device 108*a*-*b* is completed. The encoding instructions 301 may include any one or more of the representation, resolution, bitrate, sampling rate, and/or quantity of channels to encode the stream of content, one or more encoder settings, one or more CODECs and/or compression settings, filter information, or encryption parameters.

Upon receipt of the data 301 (e.g., encoding instructions), the backup encoder (e.g., the backup encoder 207*a*) of the preemptible instance computing device (e.g., the preemptible instance computing device 108*a*-*b*) may send a request for the stream of content to the input location (e.g., URL address) (e.g., the content source 102) provided by the computing device 104. In response to the request, the content source 102 or another input location provided by the computing device 104, may send or otherwise transmit (e.g., via the network 118 or another network (not shown)) the stream of content. As the backup encoder 207*a* of the preemptible instance computing device 108*a*-*b* receives the stream of content, the backup encoder 207*a* may begin encoding 302 the stream of content at an instructed representation having a particular resolution, bitrate, sampling rate and/or quantity of channels. The backup encoder 207*a* implemented by the preemptible instance computing device 108*a*-*b* may continue to encode 302 the stream of content until the temporary access to the preemptible instance computing device 108*a*-*b* is terminated by the third-party provider of the preemptible instance computing device 108*a*-*b* or the computing device 104 selects another preemptible instance computing device that implements a replacement backup encoder 214*a* to encode the stream of content at the instructed representation having a particular resolution, bitrate, sampling rate, and/or quantity of channels.

At 440, a computing device (e.g., the computing device 104) may determine a potential termination of access or use of the computing device 108*a*-*b* (e.g., the preemptible instance computing device 108*a*-*b*). For example, the computing device 104 may receive a message 303 or other indication from the preemptible instance computing device 108*a*-*b* and/or from the third-party provider of the preemptible instance computing device 108*a*-*b* that termination of the temporary access to the preemptible instance computing device 104 will be terminated. For example, the message 303 may include an indication of when the temporary access to the preemptible instance computing device will be terminated or expire (e.g., a particular time of day (e.g., 3:20 p.m.), or in a particular or approximate amount of time (e.g., in two minutes or in about two minutes).

In another example, the computing device 104 may determine a potential termination of the temporary access to the preemptible instance computing device 108*a*-*b* based on a probability that the temporary access to the preemptible instance computing device 108*a*-*b* will be terminated. For example, the computing device 104 may calculate the probability that the temporary access to the preemptible instance computing device 108*a*-*b* may be terminated. For example, the probability that the temporary access to the preemptible instance computing device 108*a*-*b* may be terminated may be based one or more variables, such as, the quantity of free preemptible instance computing devices 108*a*-*b* for the third party provider (either globally or in a specific geographic area), the rate that was paid for the preemptible instance computing device 108*a*-*b*, the current rate for a preemptible instance computing device 108*a*-*b* having the same general features, and a prediction of termination provided by the third-party provider. For example, the computing device 104 may obtain or request, from the third-party provider, predictive information (e.g. a percentage) that the temporary access to the preemptible instance computing device 108*a*-*b* will be terminated. For example, this predictive termination information may be provided by an application programming interface (API) of the third-party provider of the preemptible instance computing device 108*a*-*b*. The computing device 104 may use any one or more of the above-listed variables to determine a probability that the temporary access to the preemptible instance computing device 108*a*-*b* may be terminated. For example, the computing device 104 may employ a neural network, random signal processing, or a Poisson process and the one or more variables to determine the probability that the temporary access to the preemptible instance computing device 108*a*-*b* may be terminated. The computing device 104 may compare the determined probability to a termination threshold. Based on a determination that the probability satisfies a threshold (e.g., is greater than or is equal to or greater than the threshold), the computing device 104 may determine that termination of the temporary access to the preemptible instance computing device 108*a*-*b* is likely. If the computing device 104 determines that the probability does not satisfy the threshold, then the computing device 104 may periodically (e.g., any amount of time between 1 millisecond and 1 hour) recalculate the probability and compare it again to the probability threshold.

At 445, a computing device (e.g., the computing device 104) may determine a response to the potential or probable termination of the temporary access to the computing device 108*a*-*b* (e.g., the preemptible instance computing device 108*a*-*b*). For example, the computing device 104 may determine to increase the bid for the current preemptible instance computing device 108*a*-*b*. For example, the computing device 104 may determine, based on a cost/benefit analysis, that continuing to have access to the current preemptible instance computing device is worth increasing the bid for current preemptible instance computing device 108*a*-*b*. The cost/benefit analysis may be based on the current price being paid for the preemptible instance computing device, the bid necessary to maintain access to the preemptible instance computing device 108*a*-*b*, the quantity of other preemptible instance computing devices available, the cost to transfer the backup encoding operation to another preemptible instance computing device and bid cost for that other preemptible instance computing device 108*a*-*b*. In an example wherein the computing device determines to increase the bid an maintain access to the current preemptible instance computing device, the backup encoder 207a, may continue encoding 302 the stream of content at the specified representation and resolution, bitrate, sampling rate, and/or quantity of channels.

In another example, the computing device 104 may determine to bid on and obtain temporary access to another computing device 108a-b (e.g., another preemptible instance computing device 108a-b) that may be configured as a replacement backup encoder (e.g., replacement backup encoder 214a) for the backup encoder 207a embodied by the current preemptible instance computing device 108a-b. For example, the computing device 104 may determine to obtain another preemptible instance computing device 108a-b and begin encoding 307 the representation of the stream of content on the replacement backup encoder 214a of the other preemptible instance computing device before terminating encoding 302 on the current preemptible instance computing device 108a-b. By beginning encoding 307 on the replacement backup encoder 214a of the replacement or other preemptible instance computing device 108a-b before terminating encoding 302 on the backup encoder 207a of the current preemptible instance computing device 108a-b, the encoding of the stream of content at that representation will appear continuous and a user device (e.g. the user device 120a-b) that are receiving that representation of the stream of content will not have any potential loss of signal or have to change to another representation if the primary encoder (e.g., primary encoder 106a-d, 206a-g) encoding the stream of content at that representation failed at during the transition from the current preemptible instance computing device to the replacement preemptible instance computing device 108a-b.

At 450, a computing device (e.g., the computing device 104) may send a second request for a replacement computing device (e.g., a replacement preemptible instance computing device) to replace the current computing device (e.g., the current preemptible instance computing device 108a-b). For example, the computing device 104 may send the request based on the termination threshold being satisfied, based on receiving an indication from the third-party provider of the preemptible instance computing device or from the preemptible instance computing device 108a-b that a termination was likely or would occur within a period of time, or based on other information. The request may be sent from the computing device 104 to one or more third-party providers of a plurality of preemptible instance computing devices 108a-b. For example, the request may be send to the same third-party provider that is providing the current preemptible instance computing device 108a-b and/or to other third-party providers of preemptible instance computing devices. For example, the second request may include one or more resource requirements for a preemptible instance computing device 108a-b and a bid price being offered for temporary access to a replacement preemptible instance computing device 108a-b. In another example, the request may include one or more resource requirements needed by the computing device 104 for encoding one or more backup representations and a query of the current prices for a replacement preemptible instance computing device 108a-b that satisfies the requested resource requirements. The one or more third-party providers may send a response to the computing device 104 that includes the one or more current prices (or price range) for temporarily obtaining access to a preemptible instance computing device 108a-b with the requested resources. In response, the computing device 104 may send the bid request that includes the one or more resource requirements for a preemptible instance computing device 108a-b and a bid price being offered for temporary access to a preemptible instance computing device 108a-b.

At 455, a computing device (e.g., the computing device 104) may receive an indication of temporary access to a replacement computing device 108a-b (e.g., a replacement preemptible instance computing device 108a-b). For example, the indication may be a response from a third-party provider of the replacement preemptible instance computing device 108a-b. The response may be based on the second bid request sent by the computing device 104. For example, the computing device 104 may receive a response that indicates an acceptance of the second bid. The response may also include an indication or identifier of the replacement preemptible instance computing device 108a-b that the computing device 104 will temporarily have access to. For example, the indication or identifier may be a URL address for the replacement preemptible instance computing device 108a-b.

At 460, a computing device (e.g., the computing device 104) and/or the current computing device 108a-b (e.g., the current preemptible instance computing device 108a-b) may send data 304 of FIG. 3 to the replacement computing device 108a-b (e.g., the replacement preemptible instance computing device 108a-b) that embodies the replacement backup encoder 214a for encoding the backup representation at a particular resolution, bitrate, sampling rate, or quantity of channels for the stream of content. For example, the data 304 may include encoding instructions. For example, the encoding instructions 304 may include an input address (e.g., a URL address) for a device or location from which the replacement preemptible instance computing device 108a-b may receive the stream of content. For example, the input address may be a URL address associated with the content source 102 or a cache associated with or included in the computing device 104 or the computing device 110a (when the computing device 104 is part of the computing device 110a). For example, the encoding instructions 304 may include an output address (e.g., a URL address) for a device (e.g., the computing device 110b) or location to which the preemptible instance computing device 108a-b may send the encoded backup representation once encoding by the preemptible instance computing device 108a-b is completed. The encoding instructions 304 may include any one or more of the representation and/or resolution, bitrate, sampling rate, and/or quantity of channels to encode the stream of content, one or more encoder settings, one or more CODECs and/or compression settings, filter information, encryption parameters one or more timestamps for the portion of the stream of content that the backup encoder 207a is currently encoding at the current preemptible instance computing device 108a-b, or encoding types or descriptors. In certain examples, at least a portion of the encoding instructions may be sent directly from the backup encoder 207a for the current preemptible instance computing device to the replacement backup encoder 214a at the replacement preemptible instance computing device 108a-b.

Upon receipt of the data 304 (e.g., encoding instructions), the replacement backup encoder (e.g., the backup encoder 214a) of the replacement preemptible instance computing device 108a-b may begin to initialize 305 the encoding process for the stream of content at the particular representation. For example, the replacement backup encoder 214a may send, to the input location (e.g., URL address) (e.g., the content source 102) and via the replacement preemptible instance computing device 108a-b, a request to receive the stream of content. In response to the request, the content source 102 or another input location provided by the computing device 104, may send or otherwise transmit (e.g., via the network 118 or another network (not shown)) the stream of content.

At 465, a computing device (e.g., the computing device 104) may send a request 306 to or otherwise cause the replacement backup encoder 214a of the replacement computing device 108a-b (e.g., the replacement preemptible instance computing device 108a-b) to begin encoding 307 the stream of content at the same representation as the stream of content was being encoded at the current preemptible instance computing device. The replacement backup encoder 214a of the replacement preemptible instance computing device 108a-b may begin encoding 307 the stream of content.

At 470, a computing device (e.g., the computing device 104) may send a request or message 308 to the backup encoder 207a embodied in the first computing device 108a-b (e.g., the first preemptible instance computing device 108a-b) to stop or otherwise terminate encoding of the stream of content at the particular representation. In response to receiving the message 308, the backup encoder 207a may cease encoding 308 and temporary access to the first preemptible instance computing device 108a-b may be terminated.

FIG. 5 shows a flowchart of an example method 500 for determining a quantity of backup representations to encode based on content viewership of content within a stream of content. At 505, a computing device (e.g., the computing device 104 or computing device 110a) may receive a stream of content. The stream of content may be received from a content source 102. For example, the stream of content may include audio content and/or video content. For example, the stream of content may be a live stream of content (e.g., a linear content stream) a video-on-demand stream of content or another stream of content.

At 510, a computing device (e.g., the computing device 104 or computing device 110a) may determine a quantity of representations for the stream of content. For example, the quantity of representations of the stream of content may be determined based on the quantity of representations being offered to user device (e.g., user devices 120a-b) by the content server 116. For example, at least a portion of the representations may include seven representations for the stream of content (e.g., 360p, 540p, 720p, 1080p, 1440p, 2160p (e.g., 4K), and 4320p (e.g., 8K)). Additional representations may exist, including, but not limited to, a plurality of representations for HTTP live streaming.

At 515, a computing device (e.g., the computing device 104 or computing device 110a) may determine a quantity of primary encoders (e.g., the primary encoders 106a-d or 206a-g) for encoding the stream of content. For example, a different primary encoder 106a-d, 206a-g may be provided for each representation of the stream of content. For example, the quantity of primary encoders 106a-d, 206a-g may equal the quantity of representations of the stream of content. For example, if seven representations for the stream of content (e.g., 360p, 540p, 720p, 1080p, 1440p, 2160p (e.g., 4K), and 4320p (e.g., 8K)), are to be made available to user devices (e.g., user devices 120a-b), then seven separate primary encoders 106a-d, 206a-g may be employed to encode the stream of content, with each primary encoder 106a-g, 206a-g encoding or being associated with one representation of the stream of content.

At 520, a computing device (e.g., the computing device 104 or the computing device 110a) may determine viewer data (e.g., a quantity of viewers of (or user devices 120a-b accessing) the content (e.g., a television show, a movie, a sporting event, a talk show, etc.) currently being sent or transmitted by the content source 102 in the stream of content). For example, the viewer data (e.g., the quantity of viewers of (or user devices 120a-b accessing) the content in the stream of content) may be the current quantity of viewers viewing the stream of content, the current quantity of user devices 120a-b accessing the content, a historical (e.g., prior) quantity of viewers of content associated with the content in the stream of content (e.g., same television show, same talk show, same sporting event, same news show, etc.), a historical quantity of user devices 120a-b accessing content associated with the content in the stream of content, a historical (e.g., prior) average quantity of viewers that viewed content associated with the content in the stream of content (e.g., same television show, same talk show, same sporting event, same news show, etc.) or the historical average quantity of user devices 120a-b that accessed content associated with the content in the stream of content. For example, the viewer data (including the quantity of user devices 120a-b accessing the stream of content) may be determined by the content server 116, another computing device of the system 100, or may be received from a third-party via a communication to the computing device 104 or another computing device of the system 100 of FIG. 1.

At 525, a computing device (e.g., the computing device 104 or computing device 110a) may compare the viewer data (e.g., the quantity of viewers for the content (or the quantity of user devices 120a-b accessing the content)) to one or more representation thresholds. Each threshold may be associated with a particular quantity or group of representations for which to generate backup representations. For example, if the viewer data is less than X quantity of viewers for (or user devices 120a-b accessing) the content in the stream of content, then zero backup representations may be encoded; if viewer data is between X and Y quantity of viewers for (or user devices 120a-b accessing) the content in the stream of content, then one backup representation (e.g., the lowest resolution representation, lowest bitrate representation, lowest sampling rate representation, and/or the representation with the lowest quantity of channels, the representation with the highest probability of use, or another representation) may be encoded; if viewer data is between Y and Z quantity of viewers for (or user devices 120a-b accessing) the content in the stream of content, then three or more backup representations may be encoded; and if viewer data is greater than Z quantity of viewers for (or user devices 120a-b accessing) the content, then backup representations for each of the plurality of representations may be encoded. The schedule provided above is for example purposes only. Those of ordinary skill in the art will recognize that many variations based on the example provided may exist and are within the scope of this disclosure.

At 530, a computing device (e.g., the computing device 104 or computing device 110a) may determine the quantity of backup representations to encode for the stream of content. For example, the quantity of backup representations to encode for the stream of content may be based on viewer data (e.g., the quantity of viewers viewing the content in the stream of content (whether current or historical) and/or the quantity of user devices 120a-b accessing the content in the stream of content (whether current or historical)) and/or one or more representation thresholds. For example, the quantity of backup representations to encode (and optionally which representations to encode) may be based on whether the viewer data satisfies one or more of the representation thresholds.

At 535, a computing device (e.g., the computing device 104 or computing device 110*a*) may send a request for access to one or more computing devices 108*a-b* (e.g., one or more preemptible instance computing devices 108*a-b*) for the at least one backup representation to be encoded. For example, the computing device 104 may send a request for at least one preemptible instance computing device 108*a-b*. The request may be sent from the computing device 104 to one or more third-party providers of a plurality of preemptible instance computing devices 108*a-b*. For example, the request may include one or more resource requirements for a preemptible instance computing device 108*a-b* and a bid price being offered for temporary access to a preemptible instance computing device 108*a-b*. The one or more resource requirements may include the processing power of the preemptible instance computing device 108*a-b*, the encoding capabilities needed in the preemptible instance computing device 108*a-b*, and/or the amount of time of use of the preemptible instance computing device 108*a-b* desired by the computing device 104. In another example, the request may include one or more resource requirements needed by the computing device 104 for encoding one or more backup representations and a query of the current prices for a preemptible instance computing device 108*a-b* that satisfies the requested resource requirements. The one or more third-party providers may send a response to the computing device 104 that includes the one or more current prices (or price range) for temporarily obtaining access to a preemptible instance computing device 108*a-b* with the requested resources. In response, the computing device 104 may send the bid request that includes the one or more resource requirements for a preemptible instance computing device 108*a-b* and a bid price being offered for temporary access to a preemptible instance computing device 108*a-b*.

At 540, a computing device (e.g., the computing device 104 or the computing device 110*a*) may receive an indication of temporary access to a computing device 108*a-b* (e.g., one or more preemptible instance computing devices 108*a-b*). For example, the indication may be a response from one or more third-party providers of the preemptible instance computing devices 108*a-b*. The response may be based on the bid request sent by the computing device 104. For example, the computing device 104 may receive a response that indicates an acceptance of a bid. The response may also include an indication or identifier of the preemptible instance computing device 108*a-b* that the computing device 104 will temporarily have access to. For example, the indication or identifier may be a URL address for the preemptible instance computing device 108*a-b*.

At 545, a computing device (e.g., the computing device 104 or the computing device 110*a*) may send data to or otherwise cause the one or more primary encoders 106*a-d*, 206*a-g* to encode the primary representations of the stream of content. For example, the data may include encoding instructions. For example, the encoding instructions may include an input address (e.g., a URL address) for a device or location from which the primary encoder 106*a-d*, 206*a-g* may receive the stream of content. For example, the input address may be a URL address associated with the content source 102 or a cache associated with or included in the computing device 104 or the computing device 110*a* (e.g., when the computing device 104 is part of the computing device 110*a*). For example, the encoding instructions may include an output address (e.g., a URL address) for a device (e.g., the computing device 110*b*) or location to which the primary encoders 106*a-d*, 206*a-g* may send the encoded primary representation once encoding by the primary encoder 106*a-d*, 206*a-g* is completed. The encoding instructions may include any one or more of the representation and/or resolution, bitrate, sampling rate, and/or quantity of channels to encode the stream of content, one or more encoder settings, one or more CODECs and/or compression settings, filter information, or encryption parameters. For example, a single computing device (e.g., the computing device 110*a*) may include multiple primary encoders 106*a-d*, 206*a-g*, each of which may be configured to encode one of the representations of the stream of content. For example, multiple computing devices may be provided, each including one primary encoder 106*a-d*, 206*a-g* for encoding one primary representation of the stream of content. For example, each of the multiple computing devices may be a separate and distinct preemptible instance computing device. In this example, the computing device 104 may submit bids and obtain temporary access to each of the preemptible instance computing devices for the primary encoders in substantially the same manner as described in 535 and 540 above.

At 550, a computing device (e.g., the computing device 104) may send data to or otherwise cause the one or more computing devices 108*a-b* (e.g., one or more preemptible instance computing devices 108*a-b*) to encode a backup representation of at least one representation of the stream of content. For example, the preemptible instance computing device 108*a-b* may be or include a backup encoder for encoding a single representation of the stream of content. For example, the data may include encoding instructions. For example, the encoding instructions may include an input address (e.g., a URL address) for a device or location from which the preemptible instance computing device 108*a-b* may receive the stream of content. For example, the input address may be a URL address associated with the content source 102 or a cache associated with or included in the computing device 104 or the computing device 110*a* (e.g., when the computing device 104 is part of the computing device 110*a*). For example, the encoding instructions may include an output address (e.g., a URL address) for a device (e.g., the computing device 110*b*) or location to which the preemptible instance computing device 108*a-b* may send the encoded backup representation once encoding by the preemptible instance computing device 108*a-b* is completed. The encoding instructions may include any one or more of the representation and/or resolution, bitrate, sampling rate, and/or quantity of channels, to encode the stream of content, one or more encoder settings, one or more CODECs and/or compression settings, filter information, or encryption parameters.

Upon receipt of the data (e.g., encoding instructions), the primary encoders 106*a-d*, 206*a-g* and the backup encoders 107*a-c*, 207*a-b* may send a request for the stream of content to the input location (e.g., URL address) (e.g., the content source 102) provided by the computing device 104. In response to the request, the content source 102 or another input location provided by the computing device 104, may send or otherwise transmit (e.g., via the network 118 or another network (not shown)) the stream of content to the primary encoders 106*a-d*, 206*a-g* and the backup encoders 107*a-c*, 207*a-b* and may begin encoding the stream of content at their respective primary representations or backup representations having particular resolutions, bitrates, sampling rates, and/or quantities of channels. The primary encoders 106*a-d*, 206*a-g* and the backup encoders 107*a-c*, 207a-b may continue to encode the stream of content. For those primary encoders 106a-d, 206a-g and the backup encoders 107a-c, 207a-b that have been implemented as part of a preemptible instance computing device 108a-b, the computing device 104 may evaluate the respective preemptible instance computing devices 108a-b to determine potential termination of the temporary access and seek to obtain replacement preemptible instance computing devices in substantially the same manner as that described in 440-470 of FIG. 4.

Figure 6:
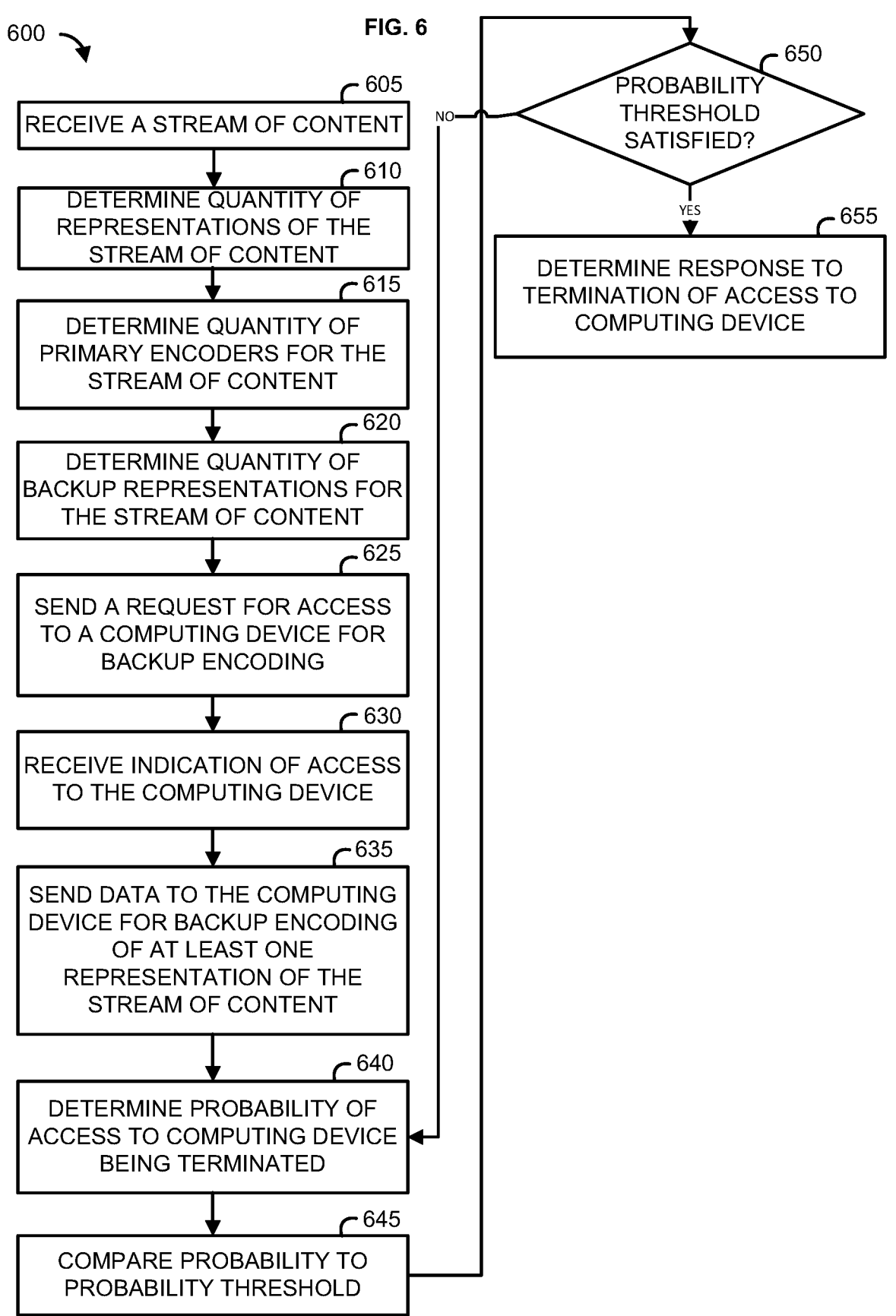
FIG. 6 shows a flowchart of an example method for encoding a stream of content.

FIG. 6 shows a flowchart of an example method 600 for determining the probability that access to a preemptible instance computing device 108a-b for encoding of a stream of content will be terminated. At 605, a computing device (e.g., the computing device 104 or computing device 110a) may receive a stream of content. The stream of content may be received from a content source 102. For example, the stream of content may include audio content and/or video content. For example, the stream of content may be a live stream of content (e.g., a linear content stream) a video-on-demand stream of content or another stream of content.

At 610, a computing device (e.g., the computing device 104 or computing device 110a) may determine a quantity of representations for the stream of content. For example, the quantity of representations of the stream of content may be determined based on the quantity of representations being offered to user device (e.g., user devices 120a-b) by the content server 116. For example, at least a portion of the representations may include seven representations for the stream of content (e.g., 360p, 540p, 720p, 1080p, 1440p, 2160p (e.g., 4K), and 4320p (e.g., 8K)). Additional representations may exist, including, but not limited to, a plurality of representations for HTTP live streaming.

At 615, a computing device (e.g., the computing device 104 or computing device 110a) may determine a quantity of primary encoders (e.g., the primary encoders 106a-d or 206a-g) for encoding the stream of content. For example, a different primary encoder 106a-d, 206a-g may be provided for each representation of the stream of content. For example, the quantity of primary encoders 106a-d, 206a-g may equal the quantity of representations of the stream of content. For example, if seven representations for the stream of content (e.g., 360p, 540p, 720p, 1080p, 1440p, 2160p (e.g., 4K), and 4320p (e.g., 8K)), are to be made available to user devices (e.g., user devices 120a-b), then seven separate primary encoders 106a-d, 206a-g may be employed to encode the stream of content, with each primary encoder 106a-g, 206a-g encoding or being associated with one representation of the stream of content.

For example, a single computing device (e.g., the computing device 110a) may include multiple primary encoders 106a-d, 206a-g, each of which may be configured to encode one of the representations of the stream of content. For example, multiple computing devices may be provided, each including one primary encoder 106a-d, 206a-g for encoding one primary representation of the stream of content. For example, each of the multiple computing devices may be a separate and distinct preemptible instance computing device. In this example, the computing device 104 may submit bids and obtain temporary access to each of the preemptible instance computing devices for the primary encoders in substantially the same manner as described in 625 and 630 below.

At 620, a computing device (e.g., the computing device 104 or computing device 110a) may determine the quantity of backup representations to encode for the stream of content. For example, the quantity of backup representations to encode for the stream of content may be equal to the quantity of representations to encode for the stream of content. For example, the quantity of backup representations to encode for the stream of content may be less than the quantity of representations to encode for the stream of content. For example, the quantity of backup representations to encode for the stream of content may be less than the quantity of primary representations encoded by the primary encoders. For example, the quantity of backup representations to encode for the stream of content may be one backup representation. For example, the one representation may be the representation with the lowest resolution, lowest bitrate, lowest sampling rate and/or fewest quantity of channels.

The quantity of backup representations to encode may be determined based on one or more factors. For example, the quantity of backup representations to encode may be based on viewer data (e.g., the quantity of viewers of (or user devices 120a-b accessing) the content in the stream of content). For example, the viewer data for the content (e.g., a television show, a movie, a sporting event, a talk show, etc.) in the stream of content may be the current quantity of viewers viewing the stream of content, the current quantity of user devices 120a-b accessing the content, a historical (e.g., prior) quantity of viewers of content associated with the content in the stream of content (e.g., same television show, same talk show, same sporting event, same news show, etc.), a historical quantity of user devices 120a-b accessing content associated with the content in the stream of content, a historical (e.g., prior) average quantity of viewers that viewed content associated with the content in the stream of content (e.g., same television show, same talk show, same sporting event, same news show, etc.) or the historical average quantity of user devices 120a-b that accessed content associated with the content in the stream of content. For example, the viewer data (including the quantity of viewers and/or the quantity of user devices 120a-b accessing the stream of content) may be determined by the content server 116, another computing device of the system 100, or may be received from a third-party via a communication to the computing device 104 or another computing device of the system 100 of FIG. 1.

For example, the computing device 104 may compare the viewer data (e.g., the quantity of viewers for the content (or the quantity of user devices 120a-b accessing the content)) to one or more representation thresholds. Each threshold may be associated with a particular quantity or group of representations for which to generate backup representations. For example, if viewer data is less than X quantity of viewers for (or user devices 120a-b accessing) the content in the stream of content, then zero backup representations may be encoded; if viewer data is between X and Y quantity of viewers for (or user devices 120a-b accessing) the content in the stream of content, then one backup representation (e.g., the lowest resolution representation, the lowest bitrate representation, the lowest sampling rate representation, and/or the representation with the fewest quantity of channels, the representation with the highest probability of use, or another representation) may be encoded; if the viewer data for the stream of content is between Y and Z quantity of viewers for (or user devices 120a-b accessing) the content in the stream of content, then three or more backup representations may be encoded; and if the viewer data for the stream of content is greater than Z quantity of viewers for (or user devices 120a-b accessing) the content, then backup representations for each of the plurality of representations may be encoded. The schedule provided above is for example purposes only. Those of ordinary skill in the art will recognize that many variations based on the example provided may exist and are within the scope of this disclosure.

For example, the quantity of backup representations to encode may be based on the time of day. For example, historical data may show that more of fewer viewers watch a particular channel associated with the stream of content during particular times of the day. For example, more viewers may, based on historical data, view the particular channel associated with the stream of content between 7 p.m.-11 p.m. local time versus 1 a.m.-5 a.m. local time. Based on this information, it may be desirable to encode more backup representations of the stream of content during the 7 p.m.-11 p.m. time period as compared to the 1 a.m.-5 a.m. local time period (e.g., encode more backup representations when a greater quantity of viewers are expected to be watching (or user devices 120a-b are expected to be accessing) the stream of content). One or more representation thresholds may be provided based on certain historical viewer data quantities for the stream of content. Each threshold may be associated with a particular quantity or group of representations for which to generate backup representations. In these examples, the content being displayed in the stream of content may be the same or different during the same period of time during the day. For example, if viewer data is under X quantity of viewers for (or user devices 120a-b accessing) the stream of content for a particular time period (e.g., any time period between 1 minute-12 hours), then zero backup representations may be encoded; if viewer data is between X and Y quantity of viewers for (or user devices 120a-b accessing) the stream of content for the particular time period, then one backup representation (e.g., the lowest resolution representation, the lowest bitrate representation, the lowest sampling rate representation, and/or the representation with the fewest quantity of channels, the representation with the highest probability of use, or another representation) may be encoded; if viewer data is between Y and Z quantity of viewers for (or user device 120a-b accessing) the stream of content for the particular time period, then three or more backup representations may be encoded; and if viewer data for the particular time period is greater than Z quantity of viewers for (or user devices 120a-b accessing) the stream of content, then backup representations for each of the plurality of representations may be encoded. The schedule provided above is for example purposes only. Those of ordinary skill in the art will recognize that many variations based on the example provided may exist and are within the scope of this disclosure.

For example, the quantity of backup representations to encode may be based on viewer data (e.g., the quantity of viewers (either current or historical) of (or user devices 120a-b accessing) the content in the stream of content at each representation). For example, a viewer threshold (which may also be a user device access threshold) may be provided for each representation. The viewer threshold may be the same or different for each representation. The viewer data (either current or historical) may be compared to the viewer threshold. If the viewer threshold is satisfied (e.g., the quantity of viewers viewing (or quantity of user devices 120a-b accessing) the stream of content is greater than the viewer threshold), then a backup representation may be encoded for the particular representation of the stream of content.

For example, the quantity of backup representations to encode may be based on a cost/benefit analysis for each representation for the stream of content. For example, the quantity of backup representations to encode may be based on a multi-variable cost function. The multi-variable cost function may factor in the probability that both a primary representation and a backup representation for the same representation will fail during the same time period (e.g., $PF(t_0 \ldots t_1)$); the quantity of viewers (or user devices 120a-b accessing the stream of content) that will experience the failure of service (e.g., at a user device (e.g., user device 120a-b) associated with a viewer) (e.g., $PV(t_0 \ldots t_1)$); and a cost of not failing. The quantity of viewers (or user devices 120a-b accessing the stream of content) that will experience a failure of service may factor in a predicted quantity of viewers for a given time and channel associated with the stream of content, a state of other representations (e.g., which other representations (e.g., either primary representations or backup representations) are expected to be available during that time period, and user device bandwidth (e.g., the ability of the user device to access a higher resolution representation, higher bitrate representation, higher sampling rate representation and/or greater quantity of channels of the stream of content). The cost of not failing may factor in one or more configuration parameters ($\lambda$) expressing a cost/failure tradeoff, the price for a preemptible instance computing device (e.g., $DC_A$) (e.g., preemptible instance computing device 108a-b) at time zero ($t_0$) (e.g., $CP(t_0, DC_A)$), and the cost to transfer encoding operations to the preemptible instance computing device ($DC_A$) (e.g., $TP(DC_A)$). Given the associated variables above, the multi-variate cost function may be expressed as $P(PF(t_0 \ldots t_1)) \times P(PV(t_0 \ldots t_1) + \lambda \times (CP(t_0), DC_A) + TP(DC_A)$. The multi-variate cost function may be solved using one or more of a neural network, random signal processing, a Poisson process, or any other known technique.

For example, the quantity of backup representations to encode may be based on the current bid price for a preemptible instance computing device (e.g., preemptible instance computing device 108a-b). For example, as the price for temporary access to a preemptible instance computing device 108a-b (e.g., per representation it can encode) rises, the fewer the quantity of backup representations to encode. For example, each representation may be associated with a cost threshold. The cost threshold may be the same or different for each representation. The current cost for temporary access to a preemptible instance computing device may be compared to the cost threshold. If the current cost for temporary access to the preemptible instance computing device is greater than, or greater than or equal to the cost threshold (e.g., satisfies the cost threshold), then a backup representation for the particular representation of the stream of content may not be encoded.

At 625, a computing device (e.g., the computing device 104 or computing device 110a) may send a request for access to one or more computing devices 108a-b (e.g., one or more preemptible instance computing devices 108a-b) for the at least one backup representation to be encoded. For example, the computing device 104 may send a request for at least one computing device 108a-b (e.g., at least one preemptible instance computing device 108a-b). The request may be sent from the computing device 104 to one or more third-party providers of a plurality of preemptible instance computing devices 108a-b. For example, the request may include one or more resource requirements for a preemptible instance computing device 108a-b and a bid price being offered for temporary access to a preemptible instance computing device 108a-b. The one or more resource requirements may include the processing power of the preemptible instance computing device 108a-b, the encoding capabilities needed in the preemptible instance computing device 108a-b, and/or the amount of time of use of the preemptible instance computing device 108*a-b* desired by the computing device 104. In another example, the request may include one or more resource requirements needed by the computing device 104 for encoding one or more backup representations and a query of the current prices for a preemptible instance computing device 108*a-b* that satisfies the requested resource requirements. The one or more third-party providers may send a response to the computing device 104 that includes the one or more current prices (or price range) for temporarily obtaining access to a preemptible instance computing device 108*a-b* with the requested resources. In response, the computing device 104 may send the bid request that includes the one or more resource requirements for a preemptible instance computing device 108*a-b* and a bid price being offered for temporary access to a preemptible instance computing device 108*a-b*.

At 630, a computing device (e.g., the computing device 104 or the computing device 110*a*) may receive an indication of temporary access to a computing device 108*a-b* (e.g., one or more of the preemptible instance computing devices 108*a-b*). For example, the indication may be a response from one or more third-party providers of the preemptible instance computing devices 108*a-b*. The response may be based on the bid request sent by the computing device 104. For example, the computing device 104 may receive a response that indicates an acceptance of a bid. The response may also include an indication or identifier of the preemptible instance computing device 108*a-b* that the computing device 104 will temporarily have access to. For example, the indication or identifier may be a URL address for the preemptible instance computing device 108*a-b*.

At 635, a computing device (e.g., the computing device 104 or the computing device 110*a*) may send data to the one or more computing devices 108*a-b* (e.g., one or more preemptible instance computing devices 108*a-b*) or otherwise cause the one or more computing device 108*a-b* to encode a backup representation of at least one representation of the stream of content. For example, the preemptible instance computing device 108*a-b* may be or include a backup encoder 107*a-c*, 207*a-b* for encoding a single representation of the stream of content. For example, the data may include encoding instructions. For example, the encoding instructions may include an input address (e.g., a URL address) for a device or location from which the preemptible instance computing device 108*a-b* may receive the stream of content. For example, the input address may be a URL address associated with the content source 102 or a cache associated with or included in the computing device 104 or the computing device 110*a* (e.g., when the computing device 104 is part of the computing device 110*a*). For example, the encoding instructions may include an output address (e.g., a URL address) for a device (e.g., the computing device 110*b*) or location to which the preemptible instance computing device 108*a-b* may send the encoded backup representation once encoding by the preemptible instance computing device 108*a-b* is completed. The encoding instructions may include any one or more of the representations and/or resolutions, bitrate, sampling rate, and/or quantity of channels to encode the stream of content, one or more encoder settings, one or more CODECs and/or compression settings, filter information, or encryption parameters.

The computing device 104 may also send data to or otherwise cause the one or more primary encoders 106*a-d*, 206*a-g* to encode the primary representations of the stream of content. For example, the data may include encoding instructions. For example, the encoding instructions may include an input address (e.g., a URL address) for a device or location from which the primary encoder 106*a-d*, 206*a-g* may receive the stream of content. For example, the input address may be a URL address associated with the content source 102 or a cache associated with or included in the computing device 104 or the computing device 110*a* (e.g., when the computing device 104 is part of the computing device 110*a*). For example, the encoding instructions may include an output address (e.g., a URL address) for a device (e.g., the computing device 110*b*) or location to which the primary encoders 106*a-d*, 206*a-g* may send the encoded primary representation once encoding by the primary encoder 106*a-d*, 206*a-g* is completed. The encoding instructions may include any one or more of the representations and/or resolutions, bitrate, sampling rate, and/or quantity of channels to encode the stream of content, one or more encoder settings, one or more CODECs and/or compression settings, filter information, or encryption parameters.

At 640, a computing device (e.g., the computing device 104 or the computing device 110*a*) may determine a probability that temporary access to the computing device 108*a-b* (e.g., the preemptible instance computing device 108*a-b*) will be terminated or preempted for use by another party. For example, the computing device 104 may calculate the probability that the temporary access to the preemptible instance computing device 108*a-b* may be terminated. For example, the probability that the temporary access to the preemptible instance computing device 108*a-b* may be terminated may be based one or more variables, such as, the quantity of free preemptible instance computing devices 108*a-b* for the third party provider (either globally or in a specific geographic area), the rate that was paid for the preemptible instance computing device 108*a-b*, the current rate for a preemptible instance computing device 108*a-b* having the same general features, and a prediction of termination provided by the third-party provider. For example, the computing device 104 may obtain or request, from the third-party provider, predictive information (e.g. a percentage) that the temporary access to the preemptible instance computing device 108*a-b* will be terminated. For example, this predictive termination information may be provided by an application programming interface (API) of the third-party provider of the preemptible instance computing device 108*a-b*. The computing device 104 may use any one or more of the above-listed variables to determine a probability that the temporary access to the preemptible instance computing device 108*a-b* may be terminated. For example, the computing device 104 may employ a neural network, random signal processing, or a Poisson process and the one or more variables to determine the probability that the temporary access to the preemptible instance computing device 108*a-b* may be terminated.

At 645, a computing device (e.g., the computing device 104 or the computing device 110*a*) may compare the determined probability to a probability threshold. At 650, the computing device 104 may determine if the probability threshold is satisfied. Based on a determination that the determined probability satisfies a threshold (e.g., is greater than or is equal to or greater than the threshold), the computing device 104 may determine that termination of the temporary access to the computing device 108*a-b* (e.g., the preemptible instance computing device 108*a-b*) is likely. For example, the probability threshold may be satisfied if the calculated probability is greater than or greater than or equal to the probability threshold. If the probability threshold is not satisfied, the NO branch may be followed to 640. For example, the computing device 104 may periodically (e.g., any amount of time between 1 millisecond and 1 hour)

recalculate the probability and compare it again to the probability threshold. If the probability threshold is satisfied, the YES branch may be followed to 655.

At 655, a computing device (e.g., the computing device 104 or the computing device 110*a*) may determine a response to the potential or probable termination of the temporary access to the computing device 108*a-b* (e.g., the preemptible instance computing device 108*a-b*). For example, the computing device 104 may determine to increase the bid for the current preemptible instance computing device 108*a-b*. For example, the computing device 104 may determine, based on a cost/benefit analysis, that continuing to have access to the current preemptible instance computing device is worth increasing the bid for current preemptible instance computing device 108*a-b*. The cost/ benefit analysis may be based on the current price being paid for the preemptible instance computing device, the bid necessary to maintain access to the preemptible instance computing device 108*a-b*, the quantity of other preemptible instance computing devices available, the cost to transfer the backup encoding operation to another preemptible instance computing device and bid cost for that other preemptible instance computing device 108*a-b*. In an example wherein the computing device determines to increase the bid an maintain access to the current preemptible instance computing device, the backup encoder 207*a*, may continue encoding 302 the stream of content at the specified representation and resolution, bitrate, sampling rate, and/or quantity of channels.

In another example, the computing device 104 may determine to bid on and obtain temporary access to another computing device 108*a-b* (e.g., another preemptible instance computing device 108*a-b*) that may be configured as a replacement backup encoder (e.g., replacement backup encoder 214*a*) for the backup encoder 207*a* embodied by the current preemptible instance computing device 108*a-b*. For example, the computing device 104 may determine to obtain another preemptible instance computing device 108*a-b* and begin encoding the representation of the stream of content on the replacement backup encoder 214*a* of the other preemptible instance computing device before terminating encoding on the current preemptible instance computing device 108*a-b*. By beginning encoding on the replacement backup encoder 214*a* of the replacement or other preemptible instance computing device 108*a-b* before terminating encoding on the backup encoder 207*a* of the current preemptible instance computing device 108*a-b*, the encoding of the stream of content at that representation will appear continuous and a user device (e.g. the user device 120*a-b*) that are receiving that representation of the stream of content will not have any potential loss of signal or have to change to another representation if the primary encoder (e.g., primary encoder 106*a-d*, 206*a-g*) encoding the stream of content at that representation failed at during the transition from the current preemptible instance computing device to the replacement preemptible instance computing device 108*a-b*.

FIG. 7 shows a flowchart of an example method 700 for determining a single backup representation to encode for a stream of content. At 710, a computing device (e.g., the computing device 104 or computing device 110*a*) may receive a stream of content. The stream of content may be received from a content source 102. For example, the stream of content may include audio content and/or video content. For example, the stream of content may be a live stream of content (e.g., a linear content stream) a video-on-demand stream of content or another stream of content.

At 720, a computing device (e.g., the computing device 104 or computing device 110*a*) may determine a quantity of representations for the stream of content. For example, the quantity of representations of the stream of content may be determined based on the quantity of representations being offered to user device (e.g., user devices 120*a-b*) by the content server 116. For example, at least a portion of the representations may include seven representations for the stream of content (e.g., 360p, 540p, 720p, 1080p, 1440p, 2160p (e.g., 4K), and 4320p (e.g., 8K)). Additional representations may exist, including, but not limited to, a plurality of representations for HTTP live streaming.

At 730, a computing device (e.g., the computing device 104 or computing device 110*a*) may determine a quantity of primary encoders (e.g., the primary encoders 106*a-d* or 206*a-g*) for encoding the stream of content. For example, a different primary encoder 106*a-d*, 206*a-g* may be provided for each representation of the stream of content. For example, the quantity of primary encoders 106*a-d*, 206*a-g* may equal the quantity of representations of the stream of content. For example, if seven representations for the stream of content (e.g., 360p, 540p, 720p, 1080p, 1440p, 2160p (e.g., 4K), and 4320p (e.g., 8K)), are to be made available to user devices (e.g., user devices 120*a-b*), then seven separate primary encoders 106*a-d*, 206*a-g* may be employed to encode the stream of content, with each primary encoder 106*a-g*, 206*a-g* encoding or being associated with one representation of the stream of content.

For example, a single computing device (e.g., the computing device 110*a*) may include multiple primary encoders 106*a-d*, 206*a-g*, each of which may be configured to encode one of the representations of the stream of content. For example, multiple computing devices may be provided, each including one primary encoder 106*a-d*, 206*a-g* for encoding one primary representation of the stream of content. For example, each of the multiple computing devices may be a separate and distinct preemptible instance computing device. In this example, the computing device 104 may submit bids and obtain temporary access to each of the preemptible instance computing devices for the primary encoders in substantially the same manner as described in 750 and 760 below.

At 740, a computing device (e.g., the computing device 104 or the computing device 110*a*) may determine the lowest resolution representation (e.g., the lowest resolution primary representation)(or lowest bitrate representation, lowest sampling rate representation, and/or representation with the fewest quantity of channels) for the stream of content. For example, if primary representations are being encoded for the following representations 360p, 540p, 720p, 1080p, 1440p, 2160p (e.g., 4K), and 4320p (e.g., 8K), the computing device 104 may determine that 360p is the representation with the lowest resolution. In another example, rather the representation with the lowest resolution, lowest bitrate, lowest sampling rate and/or fewest quantity of channels, the computing device 104 may determine the representation with the lowest resolution, lowest bitrate, lowest sampling rate and/or fewest quantity of channels that also satisfies a viewer data threshold (e.g., quantity of viewers threshold or quantity of user device access threshold).

At 750, a computing device (e.g., the computing device 104 or computing device 110*a*) may determine access to a computing device 108*a-b* (e.g., a preemptible instance computing devices 108*a-b*) for encoding the lowest resolution representation (or lowest bitrate representation, lowest sampling rate representation, and/or representation with the fewest quantity of channels) or the lowest resolution representation (or lowest bitrate representation, lowest sampling rate representation, and/or representation with the fewest quantity of channels) that also satisfies a viewer data threshold. For example, the computing device 104 may determine access based on the current bid price for the preemptible instance computing device 108*a-b*. For example, the computing device 104 may determine access by sending a request for a preemptible instance computing device 108*a-b*. The request may be sent from the computing device 104 to one or more third-party providers of a plurality of preemptible instance computing devices 108*a-b*. For example, the request may include one or more resource requirements for a preemptible instance computing device 108*a-b* and a bid price being offered for temporary access to a preemptible instance computing device 108*a-b*. The one or more resource requirements may include the processing power of the preemptible instance computing device 108*a-b*, the encoding capabilities needed in the preemptible instance computing device 108*a-b*, and/or the amount of time of use of the preemptible instance computing device 108*a-b* desired by the computing device 104. In another example, the request may include one or more resource requirements needed by the computing device 104 for encoding one or more backup representations and a query of the current prices for a preemptible instance computing device 108*a-b* that satisfies the requested resource requirements. The one or more third-party providers may send a response to the computing device 104 that includes the one or more current prices (or price range) for temporarily obtaining access to a preemptible instance computing device 108*a-b* with the requested resources. In response, the computing device 104 may send the bid request that includes the one or more resource requirements for a preemptible instance computing device 108*a-b* and a bid price being offered for temporary access to a preemptible instance computing device 108*a-b*.

At 760, a computing device (e.g., the computing device 104 or the computing device 110*a*) may receive an indication of temporary access to a computing device 108*a-b* (e.g., a preemptible instance computing device 108*a-b*). For example, the indication may be a response from one or more third-party providers of the preemptible instance computing devices 108*a-b*. The response may be based on the bid request sent by the computing device 104. For example, the computing device 104 may receive a response that indicates an acceptance of a bid. The response may also include an indication or identifier of the preemptible instance computing device 108*a-b* that the computing device 104 will temporarily have access to. For example, the indication or identifier may be a URL address for the preemptible instance computing device 108*a-b*.

At 770, a computing device (e.g., the computing device 104 or the computing device 110*a*) may send data to or otherwise cause the computing device 108*a-b* (e.g., the preemptible instance computing device 108*a-b*) to encode the backup representation of the representation of the stream of content having the lowest resolution (or lowest bitrate representation, lowest sampling rate representation, and/or representation with the fewest quantity of channels) or lowest resolution (or lowest bitrate representation, lowest sampling rate representation, and/or representation with the fewest quantity of channels) that also satisfies a viewer data threshold. For example, the preemptible instance computing device 108*a-b* may be or include a backup encoder 107*a-c*, 207*a-b* for encoding a single representation of the stream of content. For example, the data may include encoding instructions. For example, the encoding instructions may include an input address (e.g., a URL address) for a device or location from which the preemptible instance computing device 108*a-b* may receive the stream of content. For example, the input address may be a URL address associated with the content source 102 or a cache associated with or included in the computing device 104 or the computing device 110*a* (e.g., when the computing device 104 is part of the computing device 110*a*). For example, the encoding instructions may include an output address (e.g., a URL address) for a device (e.g., the computing device 110*b*) or location to which the preemptible instance computing device 108*a-b* may send the encoded backup representation once encoding by the preemptible instance computing device 108*a-b* is completed. The encoding instructions may include any one or more of the representation and/or resolution, bitrate, sampling rate, and/or quantity of channels to encode the stream of content, one or more encoder settings, one or more CODECs and/or compression settings, filter information, or encryption parameters.

For example, the computing device 104 may also send data to or otherwise cause the one or more primary encoders 106*a-d*, 206*a-g* to encode the primary representations of the stream of content. For example, the data may include encoding instructions. For example, the encoding instructions may include an input address (e.g., a URL address) for a device or location from which the primary encoder 106*a-d*, 206*a-g* may receive the stream of content. For example, the input address may be a URL address associated with the content source 102 or a cache associated with or included in the computing device 104 or the computing device 110*a* (e.g., when the computing device 104 is part of the computing device 110*a*). For example, the encoding instructions may include an output address (e.g., a URL address) for a device (e.g., the computing device 110*b*) or location to which the primary encoders 106*a-d*, 206*a-g* may send the encoded primary representation once encoding by the primary encoder 106*a-d*, 206*a-g* is completed. The encoding instructions may include any one or more of the representation and/or resolution, bitrate, sampling rate, and/or quantity of channels to encode the stream of content, the one or more bitrates for the encoded primary representation of the stream of content, one or more encoder settings, one or more CODECs and/or compression settings, filter information, or encryption parameters.

Upon receipt of the data (e.g., encoding instructions), the primary encoders 106*a-d*, 206*a-g* and the backup encoder 107*a-c*, 207*a-b* may send a request for the stream of content to the input location (e.g., URL address) (e.g., the content source 102) provided by the computing device 104. In response to the request, the content source 102 or another input location provided by the computing device 104, may send or otherwise transmit (e.g., via the network 118 or another network (not shown)) the stream of content to the primary encoders 106*a-d*, 206*a-g* and the backup encoder 107*a-c*, 207*a-b* and may begin encoding the stream of content at their respective primary representations or backup representation having particular resolutions bitrates, sampling rates, and/or quantities of channels. The primary encoders 106*a-d*, 206*a-g* and the backup encoder 107*a-c*, 207*a-b* may continue to encode the stream of content. For those primary encoders 106*a-d*, 206*a-g* and the backup encoder 107*a-c*, 207*a-b* that have been implemented as part of a preemptible instance computing device 108*a-b*, the computing device 104 may evaluate the respective preemptible instance computing devices 108*a-b* to determine potential termination of the temporary access and seek to obtain replacement preemptible instance computing devices in substantially the same manner as that described in 440-470 of FIG. 4.

FIG. 8 shows a flowchart of an example method 800 for obtaining temporary access to preemptible instance computing devices 108*a-b* for primary and backup encoding or representations of a stream of content. At 810, a computing device (e.g., the computing device 104 or computing device 110*a*) may receive a stream of content. The stream of content may be received from a content source 102. For example, the stream of content may include audio content and/or video content. For example, the stream of content may be a live stream of content (e.g., a linear content stream) a video-on-demand stream of content or another stream of content.

At 820, a computing device (e.g., the computing device 104 or computing device 110*a*) may determine a quantity of representations for the stream of content. For example, the quantity of representations of the stream of content may be determined based on the quantity of representations being offered to user device (e.g., user devices 120*a-b*) by the content server 116. For example, at least a portion of the representations may include seven representations for the stream of content (e.g., 360p, 540p, 720p, 1080p, 1440p, 2160p (e.g., 4K), and 4320p (e.g., 8K)). Additional representations may exist, including, but not limited to, a plurality of representations for HTTP live streaming.

At 830, a computing device (e.g., the computing device 104 or computing device 110*a*) may determine a quantity of primary representations for the stream of content. For example, a different primary encoder 106*a-d*, 206*a-g* may be provided for each primary representation of the stream of content. For example, the quantity of primary representations may equal the quantity of representations of the stream of content. For example, if seven representations for the stream of content (e.g., 360p, 540p, 720p, 1080p, 1440p, 2160p (e.g., 4K), and 4320p (e.g., 8K)), are to be made available to user devices (e.g., user devices 120*a-b*), then seven primary representations may be generated using seven separate primary encoders 106*a-d*, 206*a-g* to encode the stream of content at each different representation. For example, the quantity of primary representations may be less than the quantity of representations of the stream of content. For example, multiple computing devices may be provided or obtained, each including or being provisioned as one primary encoder 106*a-d*, 206*a-g* for encoding one primary representation of the stream of content. For example, each of the multiple computing devices may be a separate and distinct preemptible instance computing device.

At 840, a computing device (e.g., the computing device 104 or computing device 110*a*) may determine a quantity of backup representations for the stream of content. For example, a different backup encoder 107*a-c*, 206*a-b* may be provided for each backup representation of the stream of content. For example, the quantity of backup representations may equal the quantity of representations of the stream of content and/or the quantity of primary representations to be created for the stream of content. For example, if seven primary representations for the stream of content (e.g., 360p, 540p, 720p, 1080p, 1440p, 2160p (e.g., 4K), and 4320p (e.g., 8K)), are to be made available to user devices (e.g., user devices 120*a-b*), then seven backup representations may be generated using seven separate backup encoders 107*a-c*, 207*a-b* to encode the stream of content at each different representation. For example, the quantity of backup representations may be less than the quantity of representations of the stream of content and/or less than the quantity of primary representations being encoded. For example, multiple computing devices may be provided or obtained, each including or being provisioned as one backup encoder 107*a-c*, 207*a-b* for encoding one backup representation of the stream of content. For example, each of the multiple computing devices may be a separate and distinct preemptible instance computing device.

At 850, a computing device (e.g., the computing device 104 or computing device 110*a*) may send a request for access to a plurality of computing devices 108*a-b* (e.g., a plurality of preemptible instance computing devices 108*a-b*) for each primary representation to be encoded (e.g., each preemptible instance computing device encoding one representation of the plurality of primary representations). For example, the computing device 104 may send one or more requests for a plurality of preemptible instance computing device 108*a-b*. The requests may be sent from the computing device 104 to one or more third-party providers of a plurality of preemptible instance computing devices 108*a-b*. For example, the request may include one or more resource requirements for each of the plurality of preemptible instance computing devices 108*a-b* and a bid price being offered for temporary access to each of the plurality of preemptible instance computing device 108*a-b*. The one or more resource requirements may include the processing power of each preemptible instance computing device 108*a-b*, the encoding capabilities needed in each preemptible instance computing device 108*a-b*, and/or the amount of time of use of each preemptible instance computing device 108*a-b* desired by the computing device 104. In another example, the request may include one or more resource requirements needed by the computing device 104 for encoding one or more of the primary representations and a query of the current prices for one or more preemptible instance computing devices 108*a-b* that satisfy the requested resource requirements. The one or more third-party providers may send a response to the computing device 104 that includes the one or more current prices (or price range) for temporarily obtaining access to each preemptible instance computing device 108*a-b* with the requested resources. In response, the computing device 104 may send the bid request that includes the one or more resource requirements for a preemptible instance computing device 108*a-b* and a bid price being offered for temporary access to a preemptible instance computing device 108*a-b*.

At 860, a computing device (e.g., the computing device 104 or computing device 110*a*) may send a request for access to a plurality of computing devices 108*a-b* (e.g., a plurality of preemptible instance computing devices 108*a-b*) for each backup representation to be encoded (e.g., each preemptible instance computing device 108*a-b* encoding one respective backup representation to be encoded). For example, the computing device 104 may send one or more requests for one or a plurality of preemptible instance computing device 108*a-b*. The requests may be sent from the computing device 104 to one or more third-party providers of a plurality of preemptible instance computing devices 108*a-b*. For example, the request may include one or more resource requirements for each of the one or the plurality of preemptible instance computing devices 108*a-b* and a bid price being offered for temporary access to each of the one or the plurality of preemptible instance computing device 108*a-b*. The one or more resource requirements may include the processing power of each preemptible instance computing device 108*a-b*, the encoding capabilities needed in each preemptible instance computing device 108*a-b*, and/or the amount of time of use of each preemptible instance computing device 108*a-b* desired by the computing device 104. In another example, the request may include one or more resource requirements needed by the computing device 104 for encoding one or more of the backup representations and a query of the current prices for one or more preemptible instance computing devices 108*a-b* that satisfy the requested resource requirements. The one or more third-party providers may send a response to the computing device 104 that includes the one or more current prices (or price range) for temporarily obtaining access to each preemptible instance computing device 108*a-b* with the requested resources. In response, the computing device 104 may send the bid request that includes the one or more resource requirements for a preemptible instance computing device 108*a-b* and a bid price being offered for temporary access to a preemptible instance computing device 108*a-b*.

At 870, a computing device (e.g., the computing device 104 or the computing device 110*a*) may receive one or more indications of temporary access to each of the computing devices 108*a-b* (e.g., each of the preemptible instance computing devices 108*a-b*) requested for encoding the primary representations and the backup representations. For example, each indication may be a response from one or more third-party providers of the preemptible instance computing devices 108*a-b*. Each response may be based on one or more bid requests sent by the computing device 104. For example, the computing device 104 may receive a response that indicates an acceptance of one or more bids for one or more preemptible instance computing devices 108*a-b*. Each response may also include an indication or identifier of the preemptible instance computing device 108*a-b* that the computing device 104 will temporarily have access to for encoding one of the primary or backup representations. For example, the indication or identifier may be a URL address for the particular preemptible instance computing device 108*a-b*.

At 880, a computing device (e.g., the computing device 104) may send data to each computing device 108*a-b* (e.g., each preemptible instance computing device 108*a-b*) to cause encoding a corresponding primary representation or backup representation of at least one representation of the stream of content. For example, the preemptible instance computing device 108*a-b* may be or include an encoder (e.g., encoders 206*a-g*, 207*a-g*) for encoding a single representation (either primary or backup) of the stream of content. For example, the data may include encoding instructions. For example, the encoding instructions may include an input address (e.g., a URL address) for a device or location from which the preemptible instance computing device 108*a-b* may receive the stream of content. For example, the input address may be a URL address associated with the content source 102 or a cache associated with or included in the computing device 104 or the computing device 110*a* (e.g., when the computing device 104 is part of the computing device 110*a*). For example, the encoding instructions may include an output address (e.g., a URL address) for a device (e.g., the computing device 110*a*, 110*b*) or location to which the preemptible instance computing device 108*a-b* may send the encoded representation (e.g., encoded primary representation or encoded backup representation) once encoding by the preemptible instance computing device 108*a-b* is completed. The encoding instructions may include any one or more of the representation and/or resolution, bitrate, sampling rate, and/or quantity of channels to encode the stream of content, the one or more bitrates for the encoded representation of the stream of content, one or more encoder settings, one or more CODECs and/or compression settings, filter information, or encryption parameters.

Upon receipt of the data (e.g., encoding instructions), the primary encoders 206*a-g* and the backup encoders 207*a-g* at each respective one of the plurality of preemptible instance computing devices 108*a-b*, may send a request for the stream of content to the input location (e.g., URL address) (e.g., the content source 102) provided by the computing device 104. In response to the request, the content source 102 or another input location provided by the computing device 104, may send or otherwise transmit (e.g., via the network 118 or another network (not shown)) the stream of content to the primary encoders 206*a-g* and the backup encoders 207*a-g* and may begin encoding the stream of content at their respective primary representations or backup representations having particular resolutions, bitrates, sampling rates, and/or quantity of channels. The primary encoders 206*a-g* and the backup encoders 207*a-g* may continue to encode the stream of content. For example, the computing device 104 may evaluate the respective preemptible instance computing devices 108*a-b* to determine potential termination of the temporary access and seek to obtain replacement preemptible instance computing devices in substantially the same manner as that described in 440-470 of FIG. 4.

Figure 9:
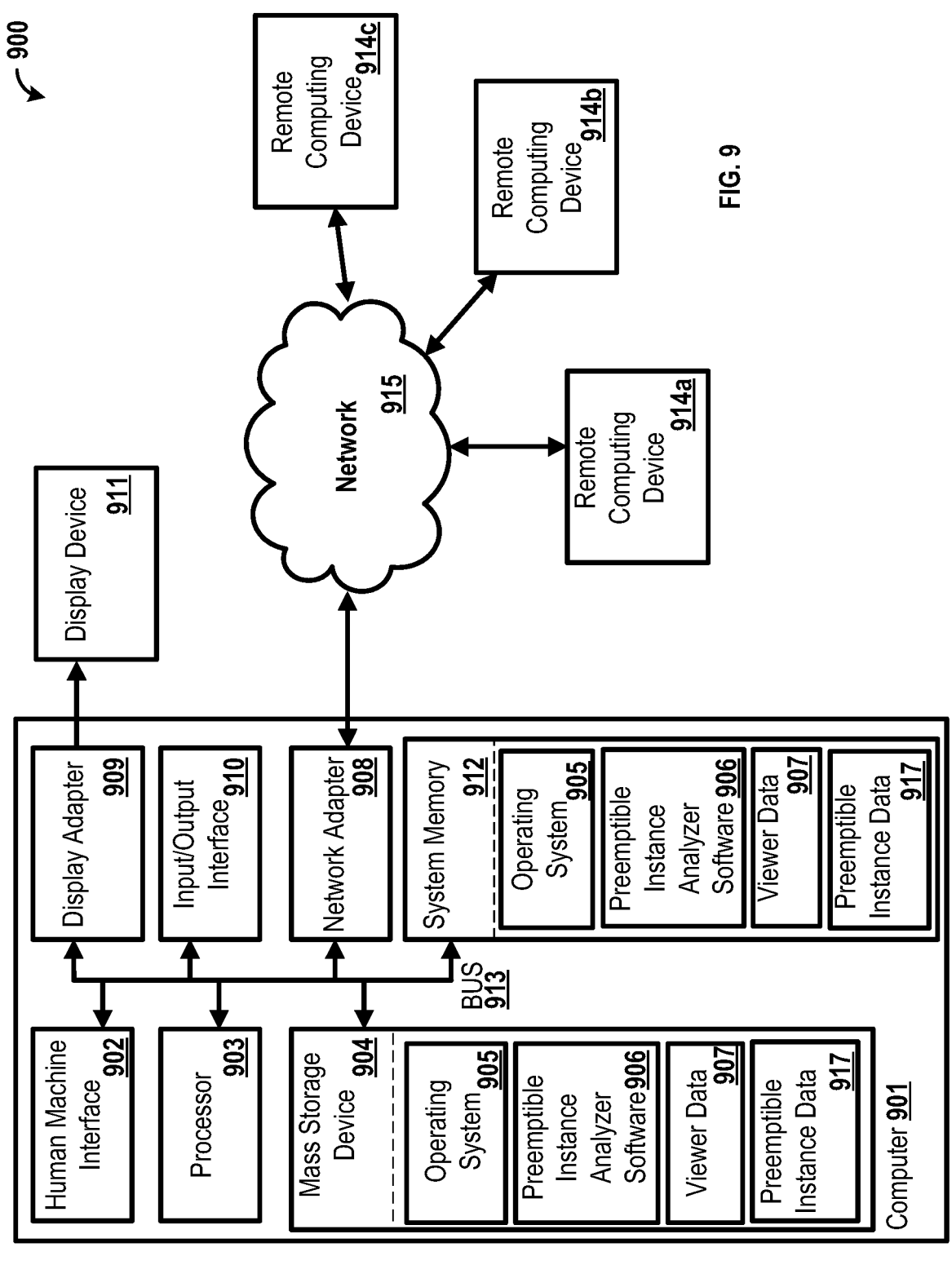
FIG. 9 shows a block diagram of a computing device for implementing methods described herein.

FIG. 9 shows a system 900 for implementing content encoding with one or more preemptible instance computing devices. Any device/component described herein may be a computer 901 as shown in FIG. 9.

The computer 901 may include one or more processors 903, a system memory 912, and a bus 913 that couples various components of the computer 901 including the one or more processors 903 to the system memory 912. In the case of multiple processors 903, the computer 901 may utilize parallel computing.

The bus 913 may include one or more of several possible types of bus structures, such as a memory bus, memory controller, a peripheral bus, an accelerated graphics port, and a processor or local bus using any of a variety of bus architectures.

The computer 901 may operate on and/or include a variety of computer readable media (e.g., non-transitory). Computer readable media may be any available media that is accessible by the computer 901 and includes, non-transitory, volatile and/or non-volatile media, removable and non-removable media. The system memory 912 has computer readable media in the form of volatile memory, such as random access memory (RAM), and/or non-volatile memory, such as read-only memory (ROM). The system memory 912 may store data such as viewer data 907 and/or preemptible instance data 917 and/or program modules such as an operating system 905 and preemptible instance analyzer software 906 that are accessible to and/or are operated on by the one or more processors 903.

The computer 901 may also include other removable/non-removable, volatile/non-volatile computer storage media. The mass storage device 904 may provide non-volatile storage of computer code, computer readable instructions, data structures, program modules, and other data for the computer 901. The mass storage device 904 may be a hard disk, a removable magnetic disk, a removable optical disk, magnetic cassettes or other magnetic storage devices, flash memory cards, CD-ROM, digital versatile disks (DVD) or other optical storage, random access memories (RAM), read-only memories (ROM), electrically erasable programmable read-only memory (EEPROM), and the like.

Any quantity of program modules may be stored on the mass storage device 904. An operating system 905 and preemptible instance analyzer software 906 may be stored on the mass storage device 904. Viewer data 907 and preemptible instance data 917 may also be stored on the mass storage device 904. The viewer data 907 and the preemptible instance data 917 may be stored in any of one or more databases known in the art. The databases may be centralized or distributed across multiple locations within the network 915.

A user may enter commands and information into the computer 901 via an input device (not shown). Such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 903 via a human machine interface 902 that is coupled to the bus 913, but may be connected by other interface and bus structures, such as a parallel port, game port, an IEEE 1394 Port (also known as a Firewire port), a serial port, network adapter 908, and/or a universal serial bus (USB).

A display device 911 may also be connected to the bus 913 via an interface, such as a display adapter 909. It is contemplated that the computer 901 may have more than one display adapter 909 and the computer 901 may have more than one display device 911. A display device 911 may be a monitor, an LCD (Liquid Crystal Display), light-emitting diode (LED) display, television, smart lens, smart glass, and/or a projector. In addition to the display device 911, other output peripheral devices may comprise components such as speakers (not shown) and a printer (not shown) which may be connected to the computer 901 via Input/Output Interface 910. Any step and/or result of the methods may be output (or caused to be output) in any form to an output device. Such output may be any form of visual representation, including, but not limited to, textual, graphical, animation, audio, tactile, and the like. The display 911 and computer 901 may be part of one device, or separate devices.

The computer 901 may operate in a networked environment using logical connections to one or more remote computing devices 914a, 914b, 914c. A remote computing device 914a, 914b, 914c may be a server, personal computer, computing station (e.g., workstation), portable computer (e.g., laptop, mobile phone, tablet device), smart device (e.g., smartphone, smartwatch, activity tracker, smart apparel, smart accessory), security and/or monitoring device, a server, a router, a network computer, a peer device, edge device or other common network nodes, and so on. Logical connections between the computer 901 and a remote computing device 914a-c may be made via a network 915, such as a local area network (LAN) and/or a general wide area network (WAN). Such network connections may be through a network adapter 908. A network adapter 908 may be implemented in both wired and wireless environments. Such networking environments are conventional and commonplace in dwellings, offices, enterprise-wide computer networks, intranets, and the Internet.

Application programs and other executable program components such as the operating system 905 are shown herein as discrete blocks, although it is recognized that such programs and components may reside at various times in different storage components of the computing device 901, and are executed by the one or more processors 903 of the computer 901. An implementation of preemptible instance analyzer software 906 may be stored on or sent across some form of computer readable media. Any of the disclosed methods may be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
   receiving, by a computing device, a stream of content;
   determining, an encoder to encode a first representation of the stream of content;
   determining a probability that use of the encoder will be terminated; and
   causing, based on the probability the use of the encoder will be terminated, a second encoder to begin encoding the first representation of the stream of content.

2. The method of claim 1, further comprising:
   determining, based on a comparison of the probability to a probability threshold, that the probability satisfies the probability threshold,
   wherein causing the second encoder to begin encoding the first representation comprises causing, based on the probability satisfying the probability threshold, the second encoder to begin encoding the first representation.

3. The method of claim 1, further comprising causing the encoder to encode the first representation of the stream of content.

4. The method of claim 1, wherein the first representation of the stream of content comprises at least one of a lowest video resolution, a lowest bitrate, a lowest sampling rate, or a fewest quantity of channels of a plurality of representations for the stream of content.

5. The method of claim 1, wherein the encoder comprises a preemptible instance computing device.

6. The method of claim 1, further comprising:
   determining, based on a comparison of viewer data, for the first representation of the stream of content, to a viewer threshold, that the viewer data is greater than the viewer threshold; and determining, based on the viewer data being greater than the viewer threshold, a quantity of backup representations of the first representation of the stream of content to encode.

7. The method of claim 6, wherein the viewer data comprises at least one of a current quantity of viewers viewing the content, a current quantity of user devices accessing the content, a historical quantity of viewers for the content, a historical quantity of user devices accessing the content, a historical average quantity of viewers of the content, or a historical average quantity of user devices accessing the content.

8. The method of claim 1, further comprising:
sending a request for access to a preemptible instance computing device, wherein the preemptible instance computing device comprises the encoder; and
receiving access to the preemptible instance computing device, wherein determining the encoder to encode the first representation comprises sending encoding instructions to the preemptible instance computing device.

9. The method of claim 5, further comprising:
determining that the access to the preemptible instance computing device will be terminated; and
causing the second encoder to begin encoding comprises receiving use rights to a second preemptible instance computing device comprising the second encoder to encode the first representation of the stream of content.

10. The method of claim 1, wherein determining that the use of the encoder will be terminated further comprises at least one of receiving a termination warning message.

11. A method comprising:
receiving, by a computing device, a stream of content;
determining a first encoder to encode a first representation of a plurality of representations of the stream of content;
determining a probability that use of the first encoder will be terminated;
determining, based on the probability that use of the first encoder will be terminated, a backup encoder to encode a backup representation for the first representation of the stream of content, wherein the first representation is encoded at a first resolution and the backup representation is encoded at the first resolution; and
causing the backup encoder to encode the backup representation.

12. The method of claim 11, wherein the first encoder is associated with a preemptible instance computing device, the method further comprising:
determining, based on the probability satisfying a probability threshold, a second preemptible instance computing device comprising the backup encoder for encoding of the backup representation.

13. The method of claim 11, wherein determining the probability the use of the first encoder will be terminated comprises determining the probability based on at least one of an instance buffer depth, a current preemptible instance computing device price, a price paid for a preemptible instance computing device comprising the first encoder, uptime of the preemptible instance computing device comprising the first encoder, a receipt of a message of a probability of termination of access to the preemptible instance computing device comprising the first encoder within a period of time, a battery state, a processor temperature, or a probability of termination information associated with the preemptible instance computing device comprising the first encoder.

14. The method of claim 11, further comprising:
receiving, from a preemptible instance computing device associated with the backup encoder, a message indicating that access to the preemptible instance computing device will be terminated within a period of time; and
determining, based on the message, at least one second preemptible instance computing device comprising a second backup encoder for backup encoding of the backup representation associated with the backup encoder.

15. The method of claim 11, wherein the first representation comprises at least one of a lowest resolution, a lowest bitrate, a lowest sampling rate, or a fewest quantity of channels for the stream of content.

16. The method of claim 11, wherein determining the backup encoder to encode the backup representation further comprises:
determining, based on the plurality of representations comprising the first representation, the first representation is an essential representation encoded at the first resolution; and
determining, based on the first representation being the essential representation, the backup encoder to encode the backup representation at the first resolution.

17. The method of claim 11, further comprising:
determining viewer data associated with the first representation of the stream of content,
wherein determining the backup encoder to encode the backup representation is further based on the viewer data.

18. A method comprising:
receiving, by a computing device, a stream of content;
determining a preemptible instance computing device comprising a first encoder to encode a first representation of the stream of content;
causing the preemptible instance computing device to begin encoding the first representation of the stream of content;
determining, based on a bid price associated with a second preemptible instance computing device, a probability the use of the preemptible instance computing device will be terminated;
determining, based on the probability the use of the preemptible instance computing device will be terminated, another preemptible instance computing device comprising a second encoder to encode a backup representation of the stream of content, wherein the first representation is encoded at a first resolution and the backup representation is encoded at the first resolution; and
causing the second encoder to encode the backup representation for the stream of content.

19. The method of claim 18, wherein the first resolution is a lowest resolution of a plurality of representations of the stream of content.

20. The method of claim 18, further comprising:
causing the preemptible instance computing device to terminate encoding of the first representation of the stream of content.

* * * * *